(12) United States Patent
Knight et al.

(10) Patent No.: US 6,431,923 B1
(45) Date of Patent: Aug. 13, 2002

(54) TROLLING MOTOR BOW MOUNT

(75) Inventors: Steven J. Knight, Madison Lake; Dale E. Simonson, Cleveland, both of MN (US)

(73) Assignee: Johnson Outdoors Inc., Sturtevant, WI (US)

( * ) Notice: Subject to any disclaimer, the term of this patent is extended or adjusted under 35 U.S.C. 154(b) by 0 days.

(21) Appl. No.: 09/593,075

(22) Filed: Jun. 13, 2000

Related U.S. Application Data

(60) Provisional application No. 60/138,890, filed on Jun. 11, 1999.

(51) Int. Cl.[7] .............................................. B63B 22/16

(52) U.S. Cl. ........................................................ 440/6

(58) Field of Search ............ 440/6, 7, 53; 248/640–642

(56) References Cited

U.S. PATENT DOCUMENTS

| | | |
|---|---|---|
| 1,671,169 A | 5/1928 | Swain |
| 2,680,000 A | 6/1954 | Pulver |
| 2,804,838 A | 9/1957 | Moser |
| 2,858,690 A | 11/1958 | Sanderson et al. |
| 2,902,967 A | 9/1959 | Wanzer |
| 2,992,551 A | 7/1961 | Cleveland |
| 3,003,733 A | 10/1961 | Peterson |
| 3,023,633 A | 3/1962 | Tudos, Jr. |
| 3,061,250 A | 10/1962 | Conover |

(List continued on next page.)

FOREIGN PATENT DOCUMENTS

| | | |
|---|---|---|
| DE | 3733731 | 4/1989 |
| GB | 2 106 848 | 4/1983 |

OTHER PUBLICATIONS

Johnny Morris "Bass Pro Shops 25th Anniversity" 1997 Catalog, front cover, back cover, pp. 319–328.
JWA Marine, Minn Kota Electric Fishing Motors, 1997, 52 pages.
Motor Guide, Take on the World, Sporting Goods, 2000 Catalog, 24 pages.
Minn Kota Marine Accessories, Quick Release Bracket, MAXXUM/RIPTIDE 42" 52" 62", 1 page, Mar. 1999.

*Primary Examiner*—Ed Swinehart
(74) *Attorney, Agent, or Firm*—Foley & Lardner

(57) ABSTRACT

A bow mount for a trolling motor and a method for releasably mounting a trolling motor to a bow of a boat are disclosed. The bow mount includes a base, a chassis, an actuation mechanism between the chassis and the base and a retaining mechanism. The base is adapted to be mounted to a bow of a boat and includes a pair of longitudinally extending spaced side channels. The chassis is adapted to be coupled to the trolling motor and includes a pair of spaced longitudinally extending side projections. The actuation mechanism is positioned between the chassis and the base and is configured to move at least one of the side projections and the side channels in a transverse direction relative to one another such that the projections extend into the channels. The retaining mechanism is configured to removably retain the projections in the channels. The method includes providing a base on the bow of the boat and having a pair of spaced side channels, providing a trolling motor assembly having a pair of spaced projections, lowering the trolling motor assembly onto the base such that at least one of the side projections extends between the pair of spaced side channels, moving at least one of the side projections and the side channels in a sideways direction relative to one another such that the projections extend into the channels and releasably retaining the projections in the channels to releasably mount the trolling motor to the bow of the boat.

24 Claims, 28 Drawing Sheets

U.S. PATENT DOCUMENTS

| | | | |
|---|---|---|---|
| 3,246,915 A | 4/1966 | Alexander |
| 3,319,060 A | 5/1967 | Bartley |
| 3,470,844 A | 10/1969 | Johns et al. |
| 3,598,947 A | 8/1971 | Osborn |
| 3,707,939 A | 1/1973 | Berg |
| 3,750,988 A | 8/1973 | Lyon |
| 3,795,219 A | 3/1974 | Peterson |
| 3,807,345 A | 4/1974 | Peterson |
| 3,822,049 A | 7/1974 | Saunders |
| 3,861,628 A | 1/1975 | Krieger |
| 3,870,258 A | 3/1975 | Shimanckas et al. |
| 3,915,417 A | 10/1975 | Norton et al. |
| 3,930,461 A | 1/1976 | Brock et al. |
| 3,948,204 A | 4/1976 | Brock et al. |
| 3,980,039 A | 9/1976 | Henning |
| 3,989,000 A | 11/1976 | Foley, Jr. |
| 3,995,579 A | 12/1976 | Childre |
| 4,033,530 A | 7/1977 | Harris |
| 4,047,686 A | 9/1977 | Porter |
| 4,094,482 A | 6/1978 | Weaver |
| 4,129,088 A | 12/1978 | Foley, Jr. |
| 4,149,691 A | 4/1979 | Moeser |
| 4,151,807 A | 5/1979 | Black, Jr. |
| 4,154,417 A | 5/1979 | Foley, Jr. |
| 4,176,580 A | 12/1979 | Gallegos |
| 4,386,918 A | 6/1983 | Matthews et al. |
| 4,417,879 A | 11/1983 | Kulischenko |
| 4,432,527 A | 2/1984 | Sample |
| 4,527,983 A | 7/1985 | Booth |
| 4,534,737 A | 8/1985 | Henderson |
| 4,535,521 A | 8/1985 | VerPlanck |
| 4,555,233 A | 11/1985 | Klammer et al. |
| 4,631,034 A | 12/1986 | Menne et al. |
| 4,658,607 A | 4/1987 | Muse, Jr. et al. |
| 4,664,644 A | 5/1987 | Kumata et al. |
| 4,668,195 A | 5/1987 | Smith |
| 4,682,960 A | 7/1987 | Hendrickson |
| 4,698,032 A | 10/1987 | Hill |
| 4,734,068 A | 3/1988 | Edwards |
| 4,735,166 A | 4/1988 | Dimalanta |
| 4,820,208 A | 4/1989 | Phillips, Sr. |
| 4,917,639 A | 4/1990 | Onoue |
| 4,932,907 A | 6/1990 | Newman et al. |
| 5,037,337 A | 8/1991 | Richter |
| 5,046,974 A | 9/1991 | Griffin, Jr. et al. |
| 5,083,948 A | 1/1992 | Grobson |
| 5,129,845 A | 7/1992 | Henderson |
| 5,169,349 A | 12/1992 | Hilbert |
| 5,174,542 A | 12/1992 | DeLeeuw, Jr. |
| 5,238,432 A | 8/1993 | Renner |
| 5,425,675 A | 6/1995 | Pfeifer |
| 5,439,401 A | 8/1995 | Clark |
| 5,465,633 A | 11/1995 | Bernloehr |
| 5,470,264 A | 11/1995 | Eick |
| 5,540,606 A | 7/1996 | Strayhorn |
| 5,580,287 A | 12/1996 | Wierenga |
| 5,607,136 A | 3/1997 | Bernloehr |
| 5,618,212 A | 4/1997 | Moore |
| 5,892,338 A | 4/1999 | Moore et al. |

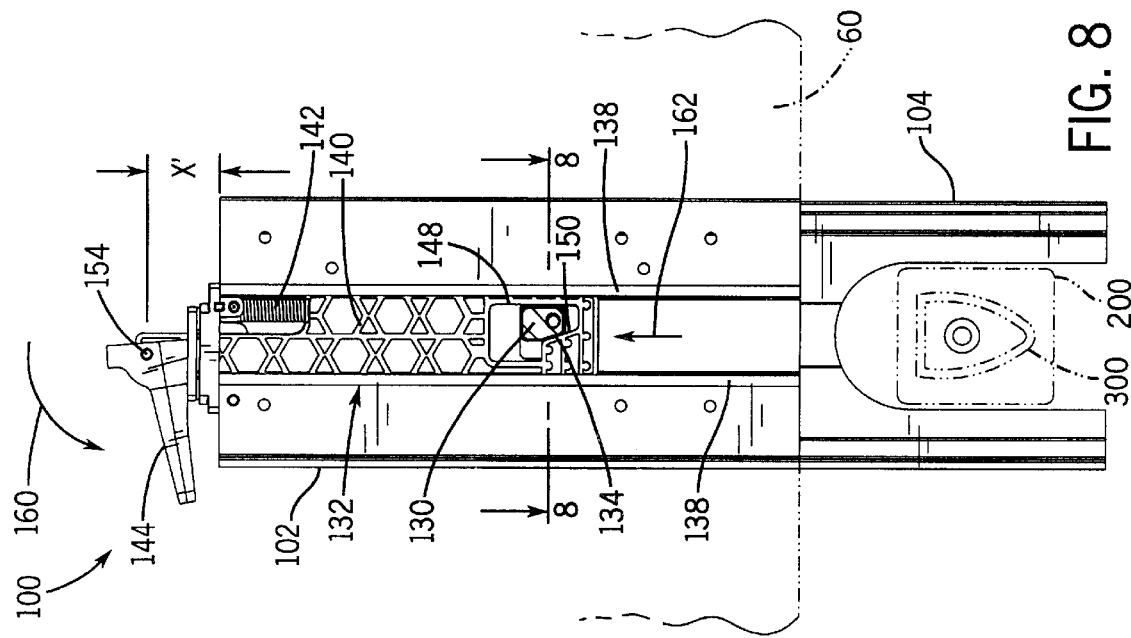
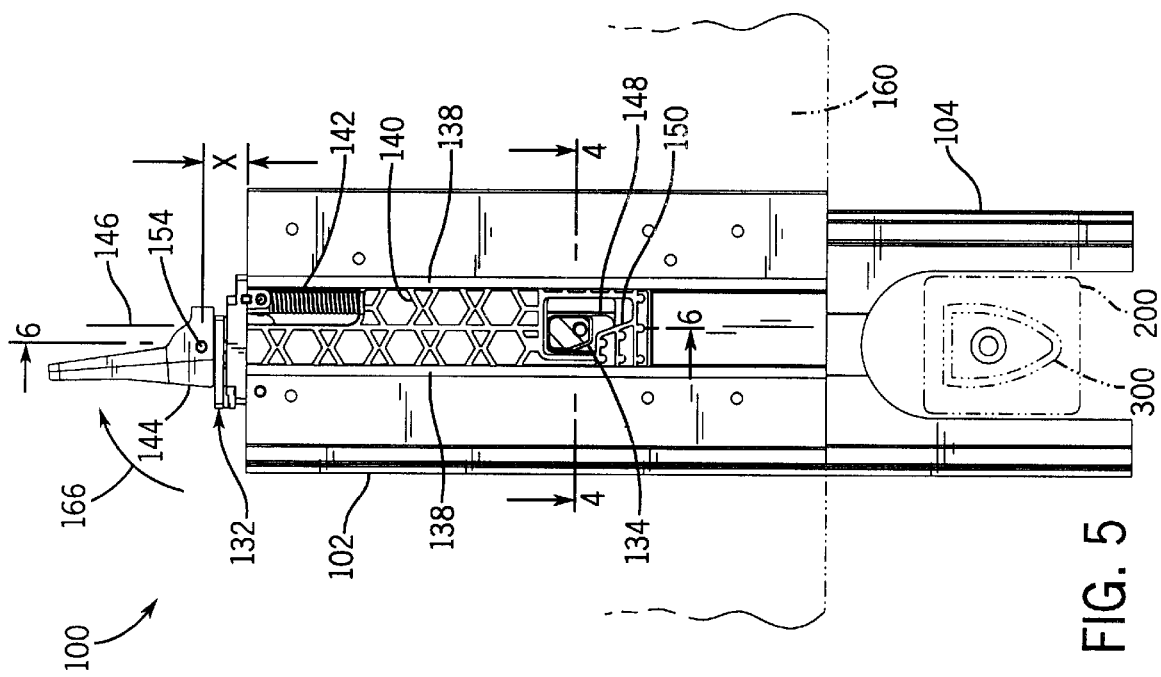

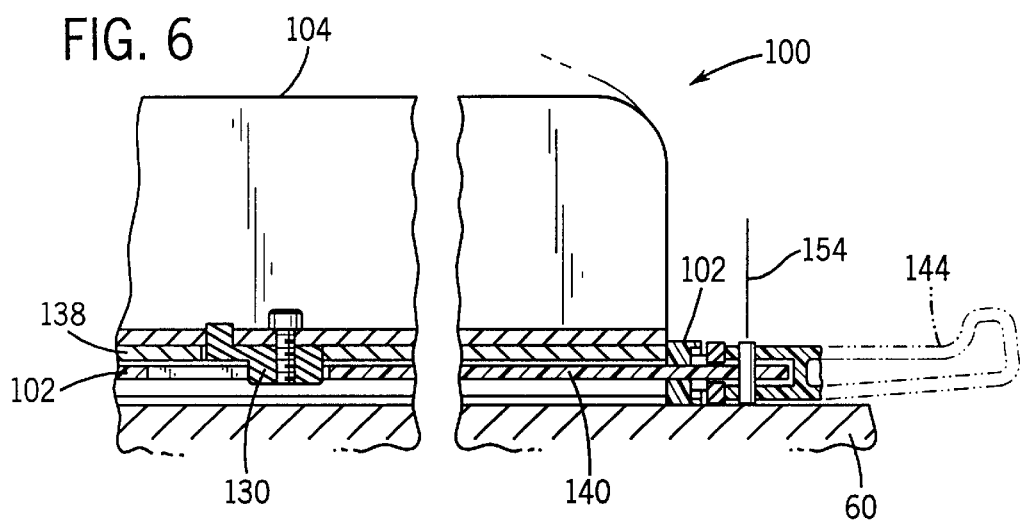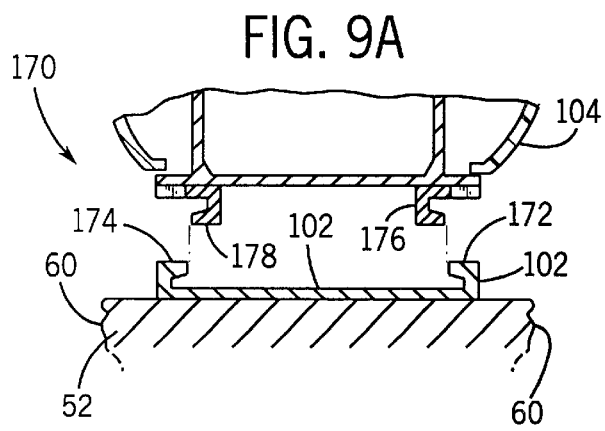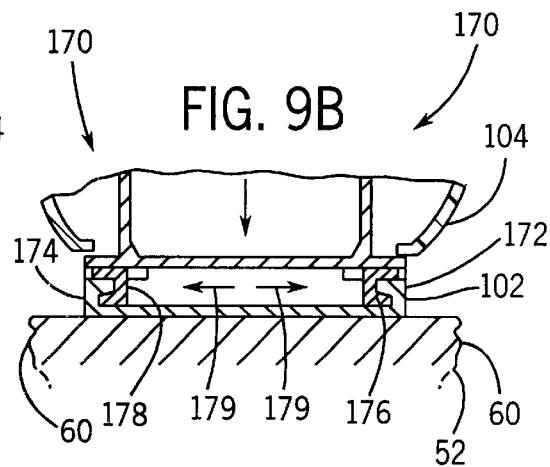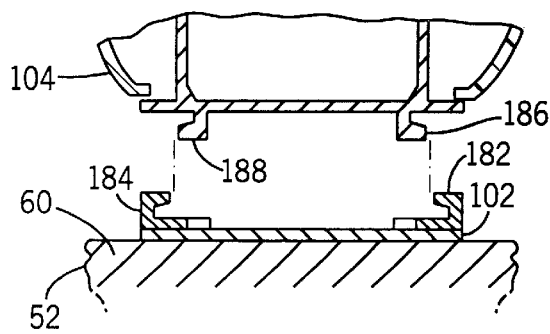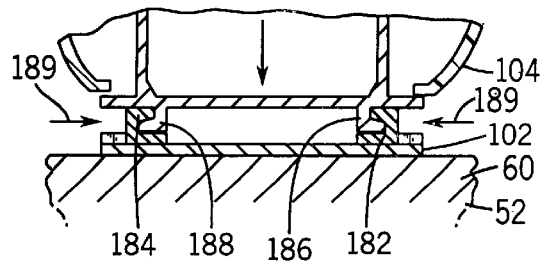

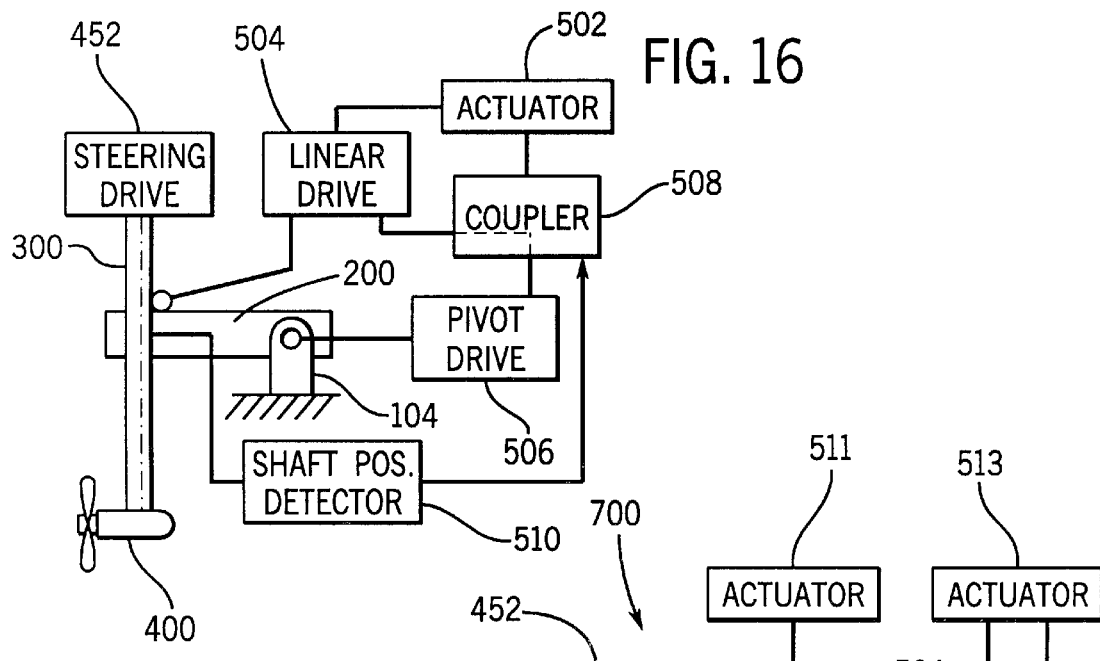
FIG. 16
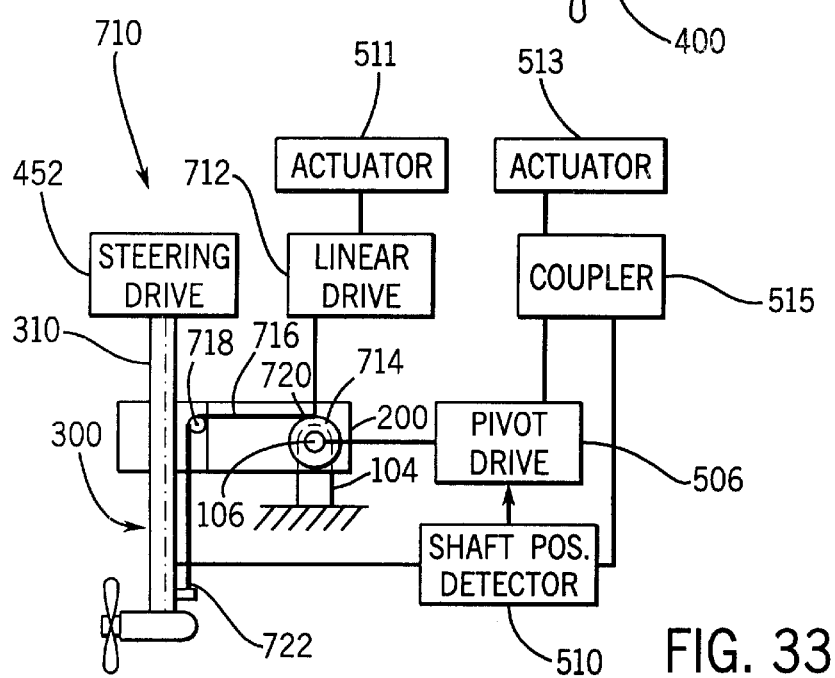
FIG. 32
FIG. 33

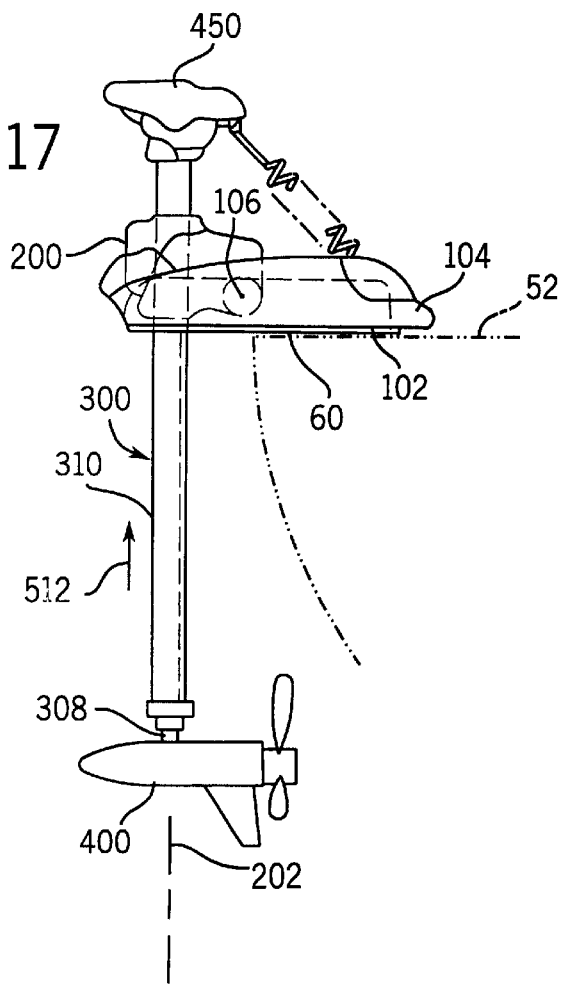
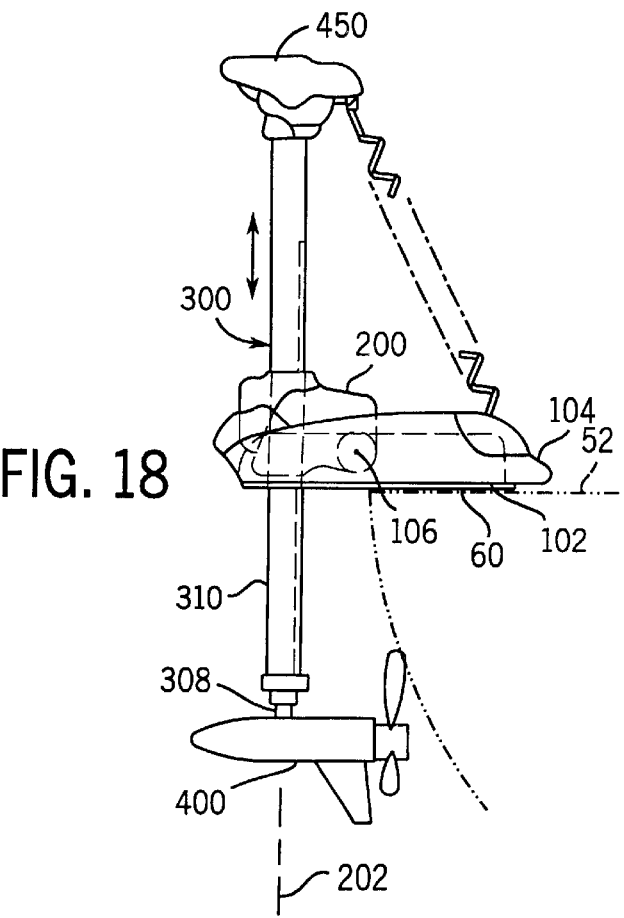
FIG. 17
FIG. 18

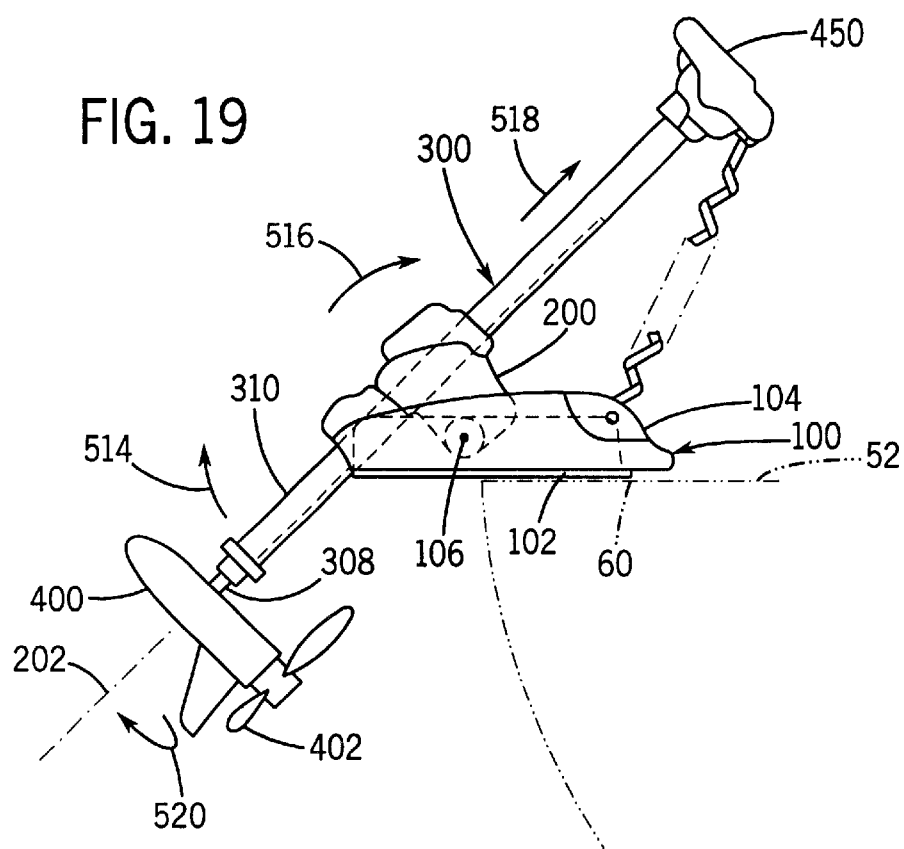
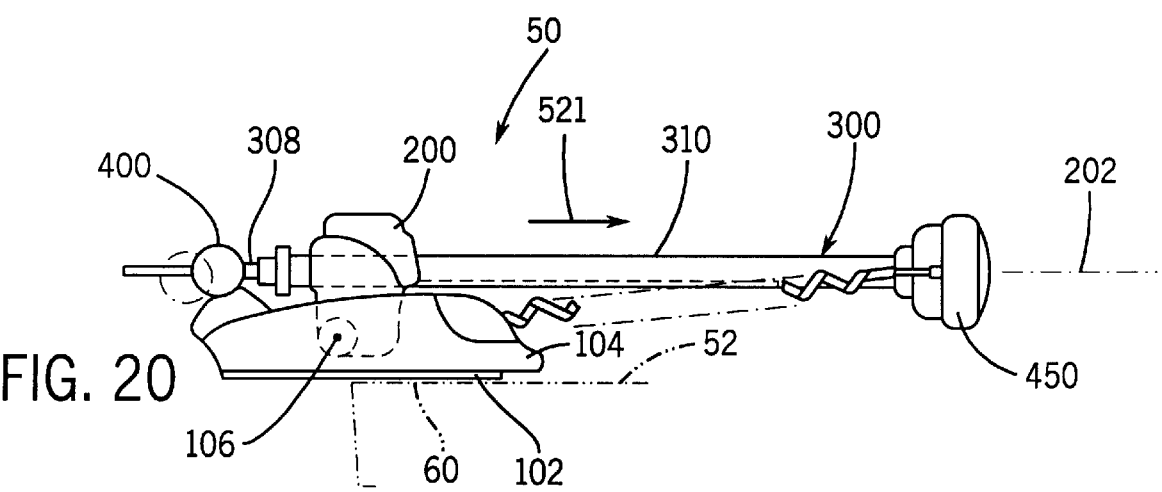

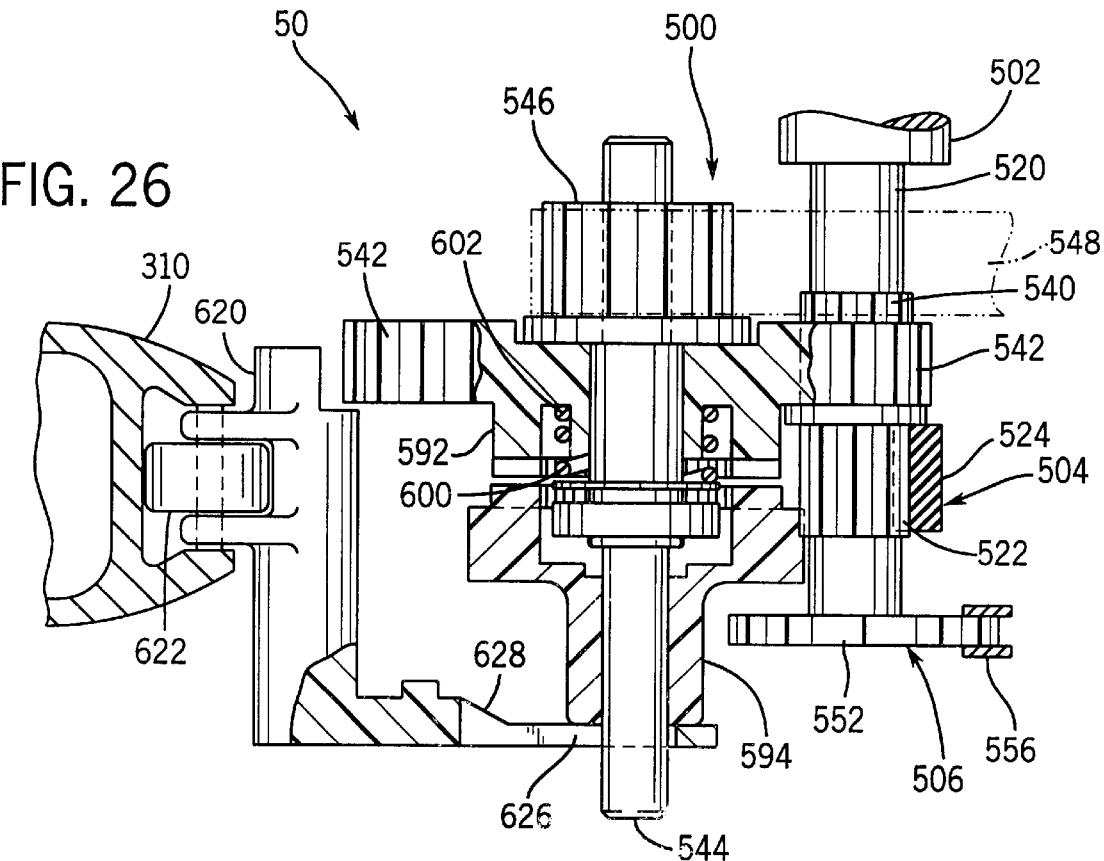
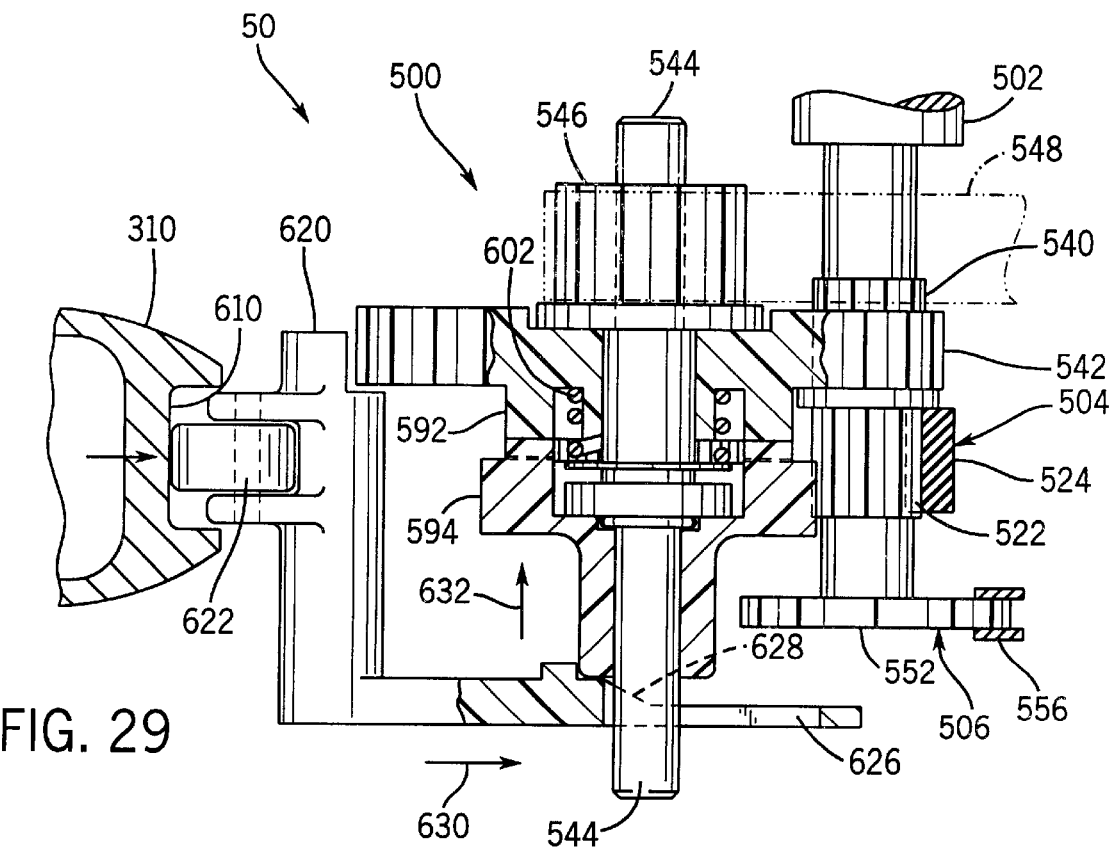

TROLLING MOTOR BOW MOUNT

CROSS REFERENCE TO RELATED APPLICATIONS

The present application claims priority under 35 U.S.C. §120 from co-pending U.S. patent application Ser. No. 09/592,023 entitled TROLLING MOTOR SYSTEM, filed on Jun. 12, 2000 which in turn claims priority under 35 U.S.C. §119(e) from U.S. Provisional Patent Application Ser. No. 60/138,890 entitled TROLLING MOTOR, filed on Jun. 11, 1999 by Darrel A. Bernloehr et al.; and further claims priority under 35 U.S.C. §120 from U.S. Pat. No. 6,276,975 entitled TROLLING MOTOR BATTERY GAUGE, issued on Aug. 21, 2001 by Steven J. Knight; U.S. patent application Ser. No. 09/590,914 entitled TROLLING MOTOR STEERING CONTROL, filed on Jun. 9, 2000 by Steven J. Knight; and U.S. patent application Ser. No. 09/591,862 entitled TROLLING MOTOR FOOT CONTROL WITH FINE SPEED ADJUSTMENT, filed on Jun. 12, 2000 by Steven J. Knight. The present application is related to U.S. patent application Ser. No. 09/592,242 entitled TROLLING MOTOR BOW MOUNT IMPACT PROTECTION SYSTEM, filed on Jun. 13, 2000 by Steven J. Knight et al.; U.S. Pat. No. 6,254,441 entitled TROLLING MOTOR PROPULSION UNIT SUPPORT SHAFT, issued on Jul. 3, 2001 by Steven J. Knight et al.; U.S. patent application Ser. No. 29/124,838 entitled TROLLING MOTOR FOOT PAD BASE, filed on Jun. 13, 2000 by Steven J. Knight et al.; U.S. patent application Ser. No. 29/124,860 entitled TROLLING MOTOR FOOT PAD PEDAL, filed on Jun. 13, 2000 by Steven J. Knight et al.; U.S. patent application Ser. No. 29/124,847 entitled TROLLING MOTOR PROPULSION UNIT SUPPORT SHAFT, filed on Jun. 13, 2000 by Steven J. Knight et al.; U.S. patent application Ser. No. 29/124,846 entitled TROLLING MOTOR MOUNT, filed on Jun. 13, 2000 by Ronald P. Hansen; and U.S. patent application Ser. No. 29/124,859 entitled TROLLING MOTOR MOUNT, filed on Jun. 13, 2000 by Ronald P. Hansen; the full disclosures of which, in their entirety, are hereby incorporated by reference.

FIELD OF THE INVENTION

The present invention relates to trolling motors. In particular, the present invention relates to a bow mount for mounting a trolling motor to a bow of a boat.

BACKGROUND OF THE INVENTION

Fishing boats and vessels are often equipped with a trolling motor for providing a relatively small amount of thrust to slowly and quietly propel the boat or vessel while the operator is fishing. Most outboard trolling motors are typically powered by a battery and are mounted to either the bow or the stern of the boat or vessel. Bow mounted trolling motors are generally mounted to the deck at the bow of a boat by means of a base plate screwed or otherwise fastened to the bow of the boat and a chassis, also known as a frame or bracket, coupled to the trolling motor and configured to mate with the base plate. The base plate typically includes a pair of upwardly and inwardly extending dovetails while the chassis includes a pair of downwardly and outwardly extending dovetails. To mount the trolling motor and its associated chassis to the base plate on the bow of the boat, the pair of outwardly extending dovetails must be precisely and accurately aligned end-to-end with the pair of inwardly extending dovetails so that the outwardly extending dovetails may be slid through the axial opening between the inwardly extending dovetails. Once the trolling motor and its chassis have been aligned and slid adjacent to the base plate such that the chassis and the base plate overlie one another, a thumb screw is inserted through an opening in the chassis and into the base plate to prevent axial movement of the chassis relative to the base plate.

Though commonly employed on many trolling motors, such bow mounts are tedious and time consuming to use. As discussed above, to secure the chassis to the base plate, the chassis and the base plate must be positioned end to end with precise alignment of the inwardly and outwardly extending dovetails. Such alignment can be extremely difficult, especially with larger and heavier trolling motors. To slide the chassis and the base plate relative to one another such that the chassis overlies the base plate requires that the chassis and its dovetails be precisely moved parallel to the base plate and its dovetails to prevent the chassis and the base plate from becoming jammed. Even after the chassis and the base plate have been aligned and slid relative to one another, mounting the trolling motor is still not complete until the thumb screw has been secured in place.

Thus, there is a continuing need for a trolling motor bow mount that enables an operator to quickly and easily releasably mount the trolling motor to the bow of a boat and to quickly and easily dismount the trolling motor from the bow of a boat.

SUMMARY OF THE INVENTION

The present invention provides a bow mount for a trolling motor. The bow mount includes a base, a chassis, an actuation mechanism between the chassis and the base and a retaining mechanism. The base is adapted to be mounted to a bow of a boat and includes a pair of longitudinally extending spaced side channels. The chassis is adapted to be coupled to the trolling motor and includes a pair of spaced longitudinally extending side projections. The actuation mechanism is positioned between the chassis and the base and is configured to move at least one of the side projections and the side channels in a transverse direction relative to one another such that the projections extend into the channels. The retaining mechanism is configured to removably retain the projections in the channels.

The present invention also provides a method for releasably mounting a trolling motor to a bow of a boat. The method includes providing a base on the bow of the boat and having a pair of spaced side channels, providing a trolling motor assembly having a pair of spaced projections, lowering the trolling motor assembly onto the base such that at least one of the side projections extends between the pair of spaced side channels, moving at least one of the side projections and the side channels in a sideways direction relative to one another such that the projections extend into the channels and releasably retaining the projections in the channels to releasably mount the trolling motor to the bow of the boat.

The present invention also provides a bow mount for a trolling motor, wherein the bow mount includes a base assembly, a chassis and a locking assembly. The base assembly is adapted to be mounted to a bow of a boat and includes a first one of a male member and a female member. The chassis is adapted to be coupled to the trolling motor and includes a second one of the male member and the female member. The locking assembly includes a first actuation surface and a second actuation surface. The first actuation surface is coupled to one of the base assembly and the chassis. The second actuation surface is movably coupled to the other of the base assembly and the chassis. The second actuation surface is movable between a locking position in which a second actuation surface engages the first actuation surface to retain the male member in the female member to lock the chassis to the base assembly in at least one direction, and a releasing position in which the second actuation surface is disengaged from the first actuation surface to permit the male member to be removed from the female member such that the chassis may be released from the base assembly in at least one direction.

The present invention also provides a trolling motor adapted to be mounted to a base having a pair of spaced side channels in a bow of a boat. The motor includes a lower propulsion unit, a shaft supporting the lower propulsion unit, a chassis supporting the shaft, an actuator and a retainer. The chassis includes a pair of spaced side projections. The actuator is adapted to move the side projections in at least one sideways direction into the side channels. The retainer is adapted to releasably retain the projections in the channels.

BRIEF DESCRIPTION OF THE DRAWINGS

FIG. 5 is a bottom elevational view of the bow mount system of FIG. 4 taken along lines 5—5.

FIG. 6 is a sectional view of the bow mount system of FIG. 5 taken along lines 6—6.

FIG. 8 is a bottom elevational view of the bow mount system of FIG. 7 taken along lines 8—8.

FIGS. 9A and 9B are sectional views of a first alternative embodiment of the bow mount system of FIG. 2 illustrating a chassis being secured to a base.

FIGS. 10A and 10B are sectional views of a second alternative embodiment of the bow mount system of FIG. 2 illustrating a chassis being secured to a base.

FIG. 16 is a schematic illustration of a drive system of the trolling motor system of FIG. 1.

FIG. 17 is a side elevational view of the trolling motor system of FIG. 1 in a first deployed position.

FIG. 18 is a side elevational view of the trolling motor system of FIG. 1 in a second raised deployed position.

FIG. 19 is a side elevational view of the trolling motor system of FIG. 1 being pivoted and linearly moved towards a stowing position.

FIG. 20 is a side elevational view of the trolling motor system of FIG. 1 being linearly moved to a fully stowed position.

FIG. 26 is a sectional view of the unit of FIG. 22 taken along lines 26—26.

FIG. 29 is a sectional view of the unit of FIG. 28 taken along lines 29—29.

FIG. 32 is a schematic view of a first alternative embodiment of the drive system of FIG. 16.

FIG. 33 is a schematic view of a second alternative embodiment of the drive system of FIG. 16.

DETAILED DESCRIPTION OF THE PREFERRED EMBODIMENTS OVERVIEW

Figure 1:
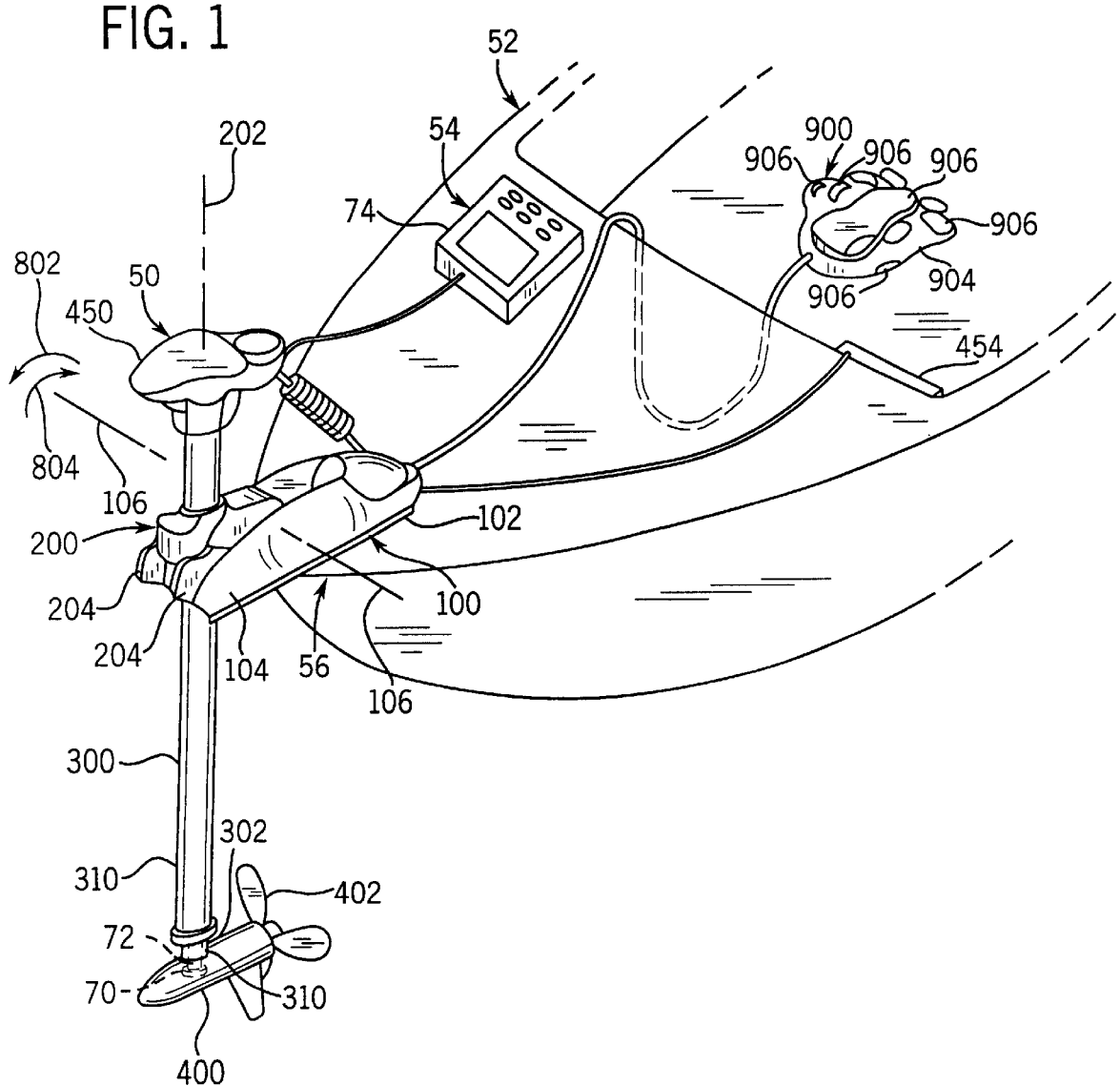
FIG. 1 is a perspective view of an exemplary trolling motor system of the present invention employed on a boat with an underwater sonar system.

FIG. 1 is a perspective view of an exemplary embodiment of the trolling motor system 50 employed on boat 52 with underwater sonar system 54. Boat 52 is a conventionally known boat or vessel which generally extends along a longitudinal axis from a front or bow 56 to a rear or stern terminating at a transom (not shown). In the exemplary embodiment, bow 56 includes a generally flat mounting surface or deck 60 upon which trolling motor system 50 is supported. As will be appreciated, boat 52 may have a variety of alternative sizes, shapes and configurations.

Underwater sonar system 54 is conventionally known and provides data depicting or identifying underwater objects such as fish and terrain. Underwater sonar system 54 generally includes transducer 70, transducer line 72 and control/display unit 74. Transducer 70 is conventionally known and mounts to propulsion unit 400 of trolling motor system 50 in a well known manner. Transducer 70 transmits and receives signals to identify underwater objects and terrain. Transducer line 72 connects transducer 70 to control/display unit 74 and transmits signals from transducer 70 to display unit 74. Display unit 74 provides visual and sound information regarding such detected underwater objects and terrain. Transducer line 72 preferably comprises one or more bundled wires. As shown by FIG. 1, transducer line 72 is at least partially housed and protected by trolling motor system 50 as described in greater detail hereafter.

Trolling motor system 50 generally includes bow mount system 100, housing 200, shaft support 300, propulsion unit 400, head 450, drive system 500 (shown in FIG. 16), impact protection system 800 (shown in FIG. 40) and foot control 900. Bow mount system 100 generally includes base 102 and chassis 104. Base 102 mounts to deck 60 and provides a support structure upon which chassis 104 may be releasably attached. In the exemplary embodiment, base 102 is screwed, bolted or otherwise permanently fastened to deck 60. It is also contemplated that base 102 may be co-molded with or integrally formed as part of deck 60 in some applications.

Figure 2:
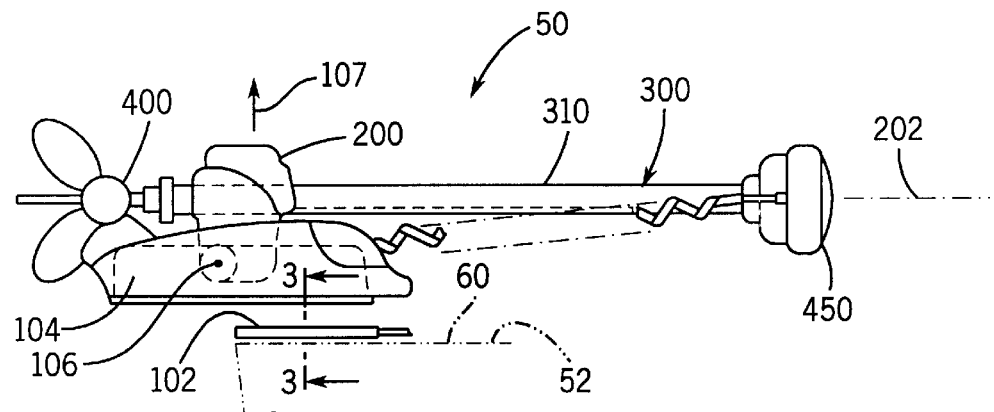
FIG. 2 is a side elevational view illustrating the trolling motor system of FIG. 1 being dismounted from the boat by means of a bow mount system.

Chassis 104 releasably mounts to base 102 and provides a stationary frame or bracket for supporting housing 200, shaft support 300, propulsion unit 400, head 450, drive system 500 and impact protection system 800 relative to boat 52. In particular, chassis 104 pivotally supports housing 200 about axis 106. As best shown by FIG. 2, bow mount system 100 enables trolling motor system 50 (shown in a fully stowed position) to be simply lifted and removed from deck 60 in the direction indicated by arrow 107 upon chassis 104 being released from base 102.

Housing 200 is pivotally coupled to chassis 104 about axis 106 and movably supports shaft support 300 and propulsion unit 400 for movement along axis 202 of shaft support 300. Housing 200 optionally includes motor rests 204 upon which propulsion unit is positioned when system 50 is in a fully stowed position. Housing 200 further provides a frame or base structure for supporting drive system 500 and impact protection system 800. Although housing 200 preferably encloses and protects drive system 500 and impact protection system 800, housing 200 may alternatively comprise an open frame or base which supports such assemblies and systems.

Shaft support 300 includes at least one shaft and is movably coupled to housing 200 for movement along axis 202 while supporting propulsion unit 400 at a lower end 302 and head 450 at an upper end 304. In addition to supporting such structures, shaft support 300 facilitates steering of propulsion unit 400 and movement of propulsion unit 400 into and out of the water during stow, trim and deploy operations. Shaft support 300 further guides and protects transducer line 72 extending from transducer 70 to control/display unit 74.

Propulsion unit 400 comprises a conventionally known lower motor prop which, upon being powered, drives a propeller 402 to generate thrust. Although propulsion unit 400 is illustrated as comprising a conventionally known motor prop with a propeller, propulsion unit 400 may alternatively comprise other devices for generating thrust under water such as jets and the like. Propulsion unit 400 is electrically coupled to head 450 and foot control 900 via wiring extending through shaft support 300.

Head 450 is supported atop shaft support 300 and includes a known steering drive 452 (shown in FIG. 13) connected to propulsion unit 400 to rotatably drive propulsion unit 400 about axis 202 to direct the thrust generated by propulsion unit 400 in a desired direction. Steering drive 452 is electronically coupled to foot control 900. Propulsion unit 400 may be steered in response to input from the operator's foot. Head 450 further includes manual inputs for controlling the amount and direction of thrust generated by propulsion unit 400. In lieu of including steering drive 452, head 450 may alternatively or additionally include a conventionally known control arm or tiller allowing manual steering of propulsion unit 400.

In addition to providing manual, hand operator interfaces to control various aspects of propulsion unit 400, head 450 also provides various information regarding propulsion unit 400 and its source of power, preferably a battery 454. In the exemplary embodiment, head 450 includes a display that indicates the amount of charge remaining within the battery 454 and the amount of time remaining until the battery is either exhausted or past a pre-selected point of charge based upon the current RPM or amount of thrust being generated by propulsion unit 400. Head 450 may also display an estimated amount of distance that can be traveled at the existing RPM or thrust output of propulsion unit 400. Moreover, head 450 may be operably or electronically tied in with global positioning system (GPS) or other location identifying mechanisms, wherein head 450 generates an alarm or other notification signal to notify the user when progress towards a recorded home position must be begun based upon the calculated or input distance from the home position, based on the current battery charge and based on the current RPM or thrust output of propulsion unit 400. A more detailed description of such operations is described in U.S. Pat. No. 6,276,975, by Steven J. Knight, entitled TROLLING MOTOR BATTERY GAUGE and issued on Aug. 21, 2001, the full disclosure of which, in its entirety, is hereby incorporated by reference. Similar controls for propulsion unit 400 are provided by foot control 900.

Drive system 500 (shown in FIG. 16) moves shaft support 300 and propulsion unit 400 during trim, stow and deploy operations. In particular, linear drive 504 linearly moves shaft support 300 and propulsion unit 400 along axis 202. Pivot drive 506 pivots housing 200 about axis 106 to reposition shaft support 300 and propulsion unit 400 from a generally vertical orientation to a generally horizontal orientation. In the exemplary embodiment, both linear drive 504 and pivot drive 506 share an actuator 502 (shown in FIG. 25) which provides power, in the form of torque, to both drives. Alternatively, linear drive 504 and pivot drive 506 may be provided with dedicated actuators. Actuator 502 preferably comprises an electrically powered motor. Although less desirable, other actuators may be used in lieu of actuator 502.

Impact protection system 800 (shown in FIG. 40) is coupled between chassis 104 and housing 200. Impact protection system 800 enables shaft support 300 and propulsion unit 400 to pivot in a generally rearward direction towards stern 58 of boat 52 as indicated by arrow 802 when encountering an underwater obstruction when boat 52 is moving in a forward direction. During such impacts, impact protection system 800 further absorbs energy to slow the forward progression of boat 52 and to reduce damage to shaft support 300 and propulsion unit 400. In addition to protecting propulsion unit 400, shaft support 300, bow mount system 100 and boat 52 itself from damage as a result of collisions with underwater obstructions, impact protection system 800 also permits housing 200, shaft support 300 and propulsion unit 400 to pivot in a generally forward direction towards bow 56 of boat 52 as indicated by arrow 804. As a result, housing 200, shaft support 300 and propulsion unit 400 may be pivoted from a generally vertical deployed orientation to a generally horizontal stowed position. Pivotal movement of housing 200, shaft support 300 and propulsion unit 400 in the opposite directions indicated by arrows 802 and 804 occurs about a single pivot point, axis 106. As a result, impact protection system 800 is simpler and less complex as compared to prior conventional systems for protecting bow mounted trolling motors during collisions with underwater obstructions.

Foot control 900 is electronically coupled to drive system 500 and is coupled to propulsion unit 400 via head 450. Foot control 900 generally comprises a foot pad 904 supporting and housing a plurality of operator interfaces 906 by which the operator can control various aspects of drive system 500 and propulsion unit 400 with his or her foot or feet. In the exemplary embodiment, interfaces 906 are electronically coupled to a control circuit supported in either pad 904, head 450 or propulsion unit 400 which generates control signals to control aspects of drive system 500 and propulsion unit 400. In the exemplary embodiment, interfaces 906 control the speed of propeller 402 of propulsion unit 400 and the resulting thrust generated by propulsion unit 400, the direction of thrust generated by propulsion unit 400, the vertical height or trim of shaft support 300 and propulsion unit 400 along axis 202 and deployment or stowing of shaft support 300 and propulsion unit 400. Such operational control provided by foot control 900 is set forth and described in greater detail in co-pending U.S. patent application Ser. No. 09/590,914, entitled TROLLING MOTOR STEERING CONTROL by Steven J. Knight and filed on Jun. 9, 2000, the full disclosure of which, in its entirety, is hereby incorporated by reference.

BOW MOUNT SYSTEM

Figure 3:
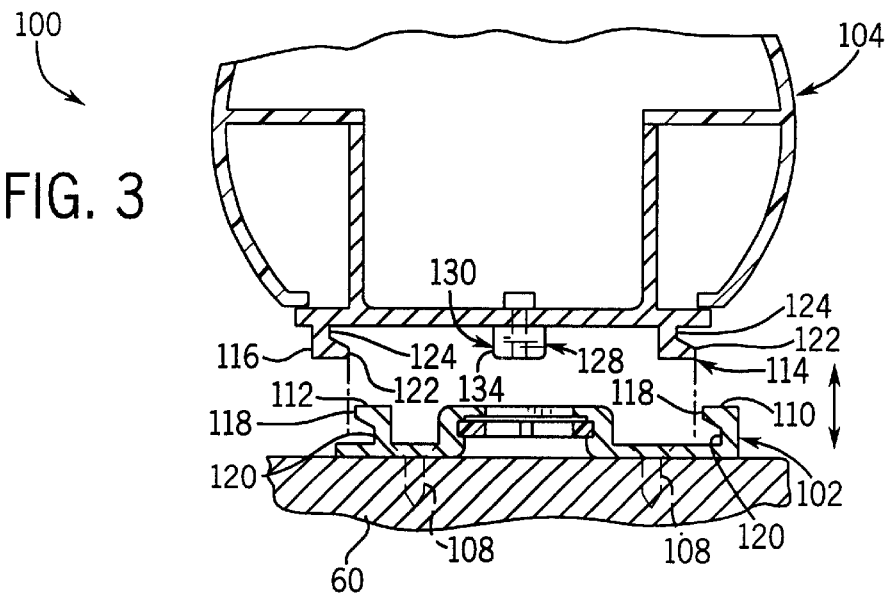
FIG. 3 is a sectional view of the bow mount system of FIG. 2 taken along lines 3—3.

FIGS. 3–8 illustrate base 102 and chassis 104 of bow mount system 100 in greater detail. As best shown by FIG. 3, base 102 is secured to deck 60 by fasteners 108 and generally includes dovetails 110, 112. Dovetails 110, 112 project from base 102 to form side projections 118 and side channels 120 which face and extend sideways in a common direction. Chassis 104 includes dovetails 114, 116. Dovetails 114, 116 extend from chassis 104 and form side projections 122 and side channels 124 to face and extend in a common direction opposite to projections 118 and channels 120.

Figure 4:
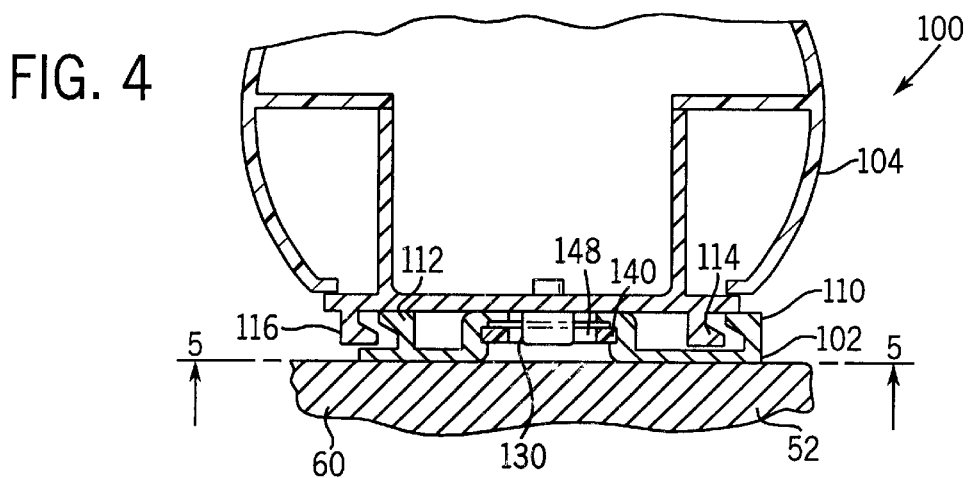
FIG. 4 is a sectional view of the bow mount system of FIG. 3 illustrating a chassis lowered onto a base of the bow mount system.
Figure 7:
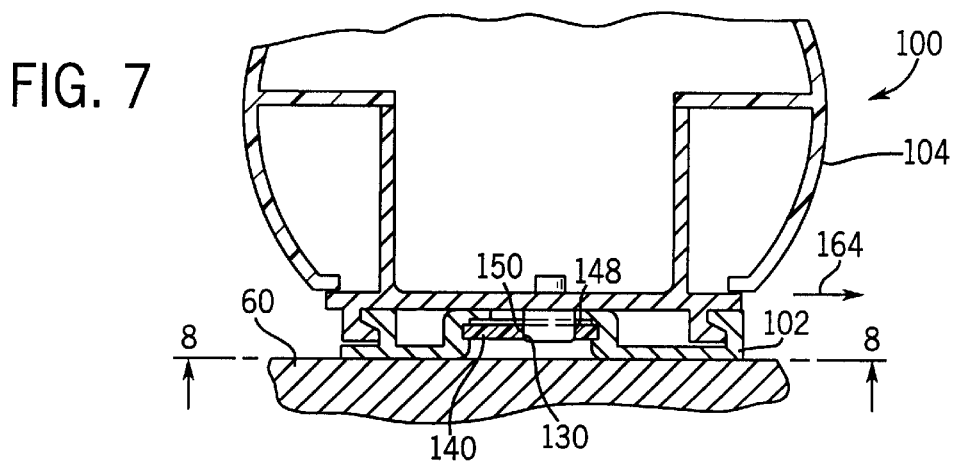
FIG. 7 is a sectional view of the bow mount system of FIG. 2 taken along lines 3—3 illustrating the chassis and the base moved relative to one another in a sideways direction.

Channels 124 are configured to receive projections 118 while channels 120 are configured to receive projections 122. In the exemplary embodiment, dovetails 114, 116 are configured to complement dovetails 110, 112 such that dovetails 110, 112 may be mated with dovetails 114, 116. In the exemplary embodiment, dovetails 110, 112 and dovetails 114, 116 extend along substantially the entire axial length of base 102 and chassis 104, respectively, for optimum mounting strength and rigidity. Alternatively, dovetails 110, 112 and dovetails 114, 116 may extend along only a portion of the axial length of base 102 and chassis 104 or may be intermittently spaced along the axial length of base 102 and chassis 104. As shown by FIG. 4, dovetails 110, 112 and dovetails 114, 116 are transversely spaced from one another so as to enable chassis 104 to be lowered onto base 102 with dovetails 110, 112, 114 and 116 in an interleaved relationship with dovetail 114 positioned between dovetails 110 and 112 and with dovetails 110, 112 and dovetails 114, 116 in a non-mating or non-engaged relationship.

As further shown by FIGS. 3, 5 and 6, bow mount system 100 additionally includes an actuation and retaining mechanism 128 between base 102 and chassis 104. Actuation mechanism 128 generally includes puck 130 and drawbar assembly 132. Puck 130 generally comprises a projection or protuberance generally extending from chassis 104. In the exemplary embodiment, puck 130 is fastened to chassis 104. Alternatively, puck 130 may be integrally formed with chassis 104. Puck 130 provides first actuation surface 134 which cooperates with drawbar assembly 132 to cause sideways movement of chassis 104 relative to base 102 to bring about inter-engagement of dovetails 110, 112, 114 and 116.

Drawbar assembly 132 is provided as part of base 102 and generally includes tracks 138, drawbar 140, spring 142 and lever 144. Tracks 138 extend from base 102 on opposite sides of drawbar 140. Tracks 138 slidably engage drawbar 140 to slidably secure drawbar 140 to base 102 such that drawbar 140 may be axially moved along axis 146. Alternatively, other mechanisms may be used to movably support drawbar 140 for movement along axis 146.

Drawbar 140 comprises an elongate rigid member slidably disposed between tracks 138 and including window 148. Window 148 extends at least partially through drawbar 140 and is sized to receive puck 130 when chassis 104 is lowered onto base 102. Window 148 is preferably continuously bounded and provides a second actuation surface 150 configured to interact with first actuation surface 134 of puck 130 when drawbar 140 is moved along axis 146. During such interaction, chassis 104 and its dovetails 114, 116 are moved in a sideways direction to engage dovetails 110 and 112, respectively. Because window 148 is continuously bounded, reception of puck 130 by window 148 further retains chassis 104 axially with respect to base 102.

As shown in FIGS. 5 and 8, drawbar 140 and actuation surface 150 move along axis 146 between a locking position (shown in FIG. 8) and a releasing position (shown in FIG. 5). In the releasing position, actuation surface 150 is disengaged from actuation surface 134 such that puck 130 may be moved sideways within window 148 and such that dovetails 114, 116 may be moved sideways and disengaged from dovetails 110, 112, respectively, to permit chassis 104 to be lifted and separated from base 102. In the locking position, actuation surface 150 has engaged actuation surface 134 to move chassis 104 relative to base 102, to wedge puck 130 in window 148, and to engage dovetails 114, 116 with dovetails 110, 112, respectively. As a result, chassis 104 is secured to base 102 in a vertical direction and in a sideways direction.

Spring 142 is coupled between drawbar 140 and base 102 and resiliently biases drawbar 140 to the releasing position. As will be appreciated, various other resilient biasing mechanisms may be used in lieu of spring 142.

Lever 144 is coupled between base 102 and drawbar 140 and actuates drawbar 140 along axis 146 against the bias of spring 142. In the exemplary embodiment, lever 144 is pivotally coupled to drawbar 140 about axis 154. Axis 154, about which lever 144 is pivotally coupled to drawbar 140, is spaced from side of base 102 by differing extents (X and X') depending upon the orientation of lever 144 about axis 154 such that rotation of lever 144 about axis 154 draws or moves drawbar 140 along axis 146.

FIGS. 3–8 further illustrate the method by which chassis 104 is releasably secured to base 102. As shown in FIGS. 3 and 4, chassis 104 is first lowered onto base 102 such that projection 122 of dovetail 114 extends between side channels 120 of dovetails 110 and 112. As shown in FIG. 8, lever 144 is then rotated in the direction indicated by arrow 160 to move drawbar 140 along axis 146 in the direction indicated by arrow 162. As a result, actuation surfaces 134 and 150 engage one another to move chassis 104 and side projections 122 of dovetails 114, 116 in a sideways direction as indicated by arrow 164 in FIG. 8 relative to base 102 and channels 120 such that channels 120 receive and mate with projections 122 to vertically retain chassis 104 relative to base 102. The over-center action provided by spring 142 and lever 144 retain drawbar 140 and its actuation surface 150 in the locking position to also prevent reverse sideways movement of chassis 104 relative to base 102.

To release and separate chassis 104 from base 102, the aforementioned operation is reversed. In particular, lever 144 is rotated in the direction indicated by arrow 166 in FIG. 5 to move drawbar 140 and actuation surface 150 to the releasing position. Thereafter, chassis 104 is moved sideways and simply lifted from base 102.

Overall, bow mount system 100 facilitates quick and easy mounting and dismounting of chassis 104 and the remaining components of trolling motor system 50 from base 102 and boat 52. Bow mount system 100 eliminates the need for precise alignment of dovetails in an end-to-end fashion and eliminates the need for precise relative parallel movement of the chassis and the base. Moreover, bow mount system 100 eliminates the need for additional tools or steps to axially retain the chassis relative to the base. Thus, bow mount system 100 represents a marked advancement over existing bow mount systems.

FIGS. 9A and 9B schematically illustrate bow mount system 170, an alternative embodiment of bow mount system 100. Bow mount system 170 is similar to bow mount system 100 except that base 102 includes inwardly extending dovetails 172, 174 and that chassis 104 includes outwardly extending dovetails 176, 178. Dovetails 176, 178 are movably coupled to chassis 104 for movement in a transverse direction. Preferably, dovetails 176 and 178 are slidably coupled to an underside of chassis 104 and are movable between a disengaged position (shown in FIG. 9A) and an engaged position shown in FIG. 9B. In the disengaged position, dovetails 176 and 178 are sufficiently close to one another so as to permit dovetails 176 and 178 to be easily lowered onto base 102 between dovetails 172 and 174. In the engaged position, dovetails 176 and 178 engage dovetails 172 and 174, respectively, with the channels receiving the corresponding projections. Actuation of dovetails 176 and 178 between the disengaged and the engaged positions is preferably accomplished by means of an actuation mechanism similar to mechanism 128 between base 102 and chassis 104 which includes actuation surfaces (not shown) coupled to base 102 and movable dovetails 176, 178. Movement and engagement of the actuation surfaces moves dovetails between the engaged and disengaged positions.

In lieu of an actuation mechanism mounted to either base 102 or chassis 104, bow mount system 170 may alternatively use an actuation mechanism which is manually inserted between dovetails 176 and 178 in a manner similar to that of a wedge so as to drive dovetails 176 and 178 away from one another in the direction indicated by arrows 179 into engagement with dovetails 172 and 174 and so as to retain dovetails 176 and 178 in the extended position. Dismounting of chassis 104 from base 102 may be accomplished by removing the wedge insert. Preferably, bow mount system 170 additionally includes a bias mechanism such as a spring (not shown) configured to resiliently bias dovetails 176 and 178 towards the disengaged position.

FIGS. 10A and 10B schematically illustrate bow mount system 180, an alternative embodiment of bow mount system 170. Bow mount system 180 is similar to bow mount system 170 except that in lieu of dovetails 176 and 178 being transversely movable between an engaged position and a disengaged position, base 102 includes dovetails 182, 184 which are transversely movable between a disengaged position shown in FIG. 10A and an engaged position shown in FIG. 10B. Dovetails 182 and 184 are preferably slidably secured to base 102. Preferably, dovetails 182 and 184 are resiliently biased by a bias mechanism such as a spring (not shown) towards the disengaged position to permit chassis 104 to be easily lowered onto base 102 with dovetails 186, 188 of chassis 104 being positioned between dovetails 182 and 184. Dovetails 182 and 184 are actuated between the engaged position and the disengaged position by means of an actuation mechanism configured to move dovetails 182 and 184 towards one another in the direction indicated by arrows 189.

FIGS. 9A, 9B, 10A and 10B schematically illustrate but two variations of bow mount system 100. Various other alternatives are also contemplated. For example, drawbar assembly 40 may alternatively be supported along chassis 104 while puck 130 is provided on base 102. In lieu of utilizing dovetails for the provision of male side projections and female side channels, base 102 and chassis 104 may alternatively be provided with other variously shaped and configured cooperating male and female members. Moreover, mechanism 128 may have a variety of alternative configurations for moving one of or both of base 102 and chassis 104 relative to one another in a sideways direction to interlock chassis 104 to base 102.

HOUSING

Figure 11:
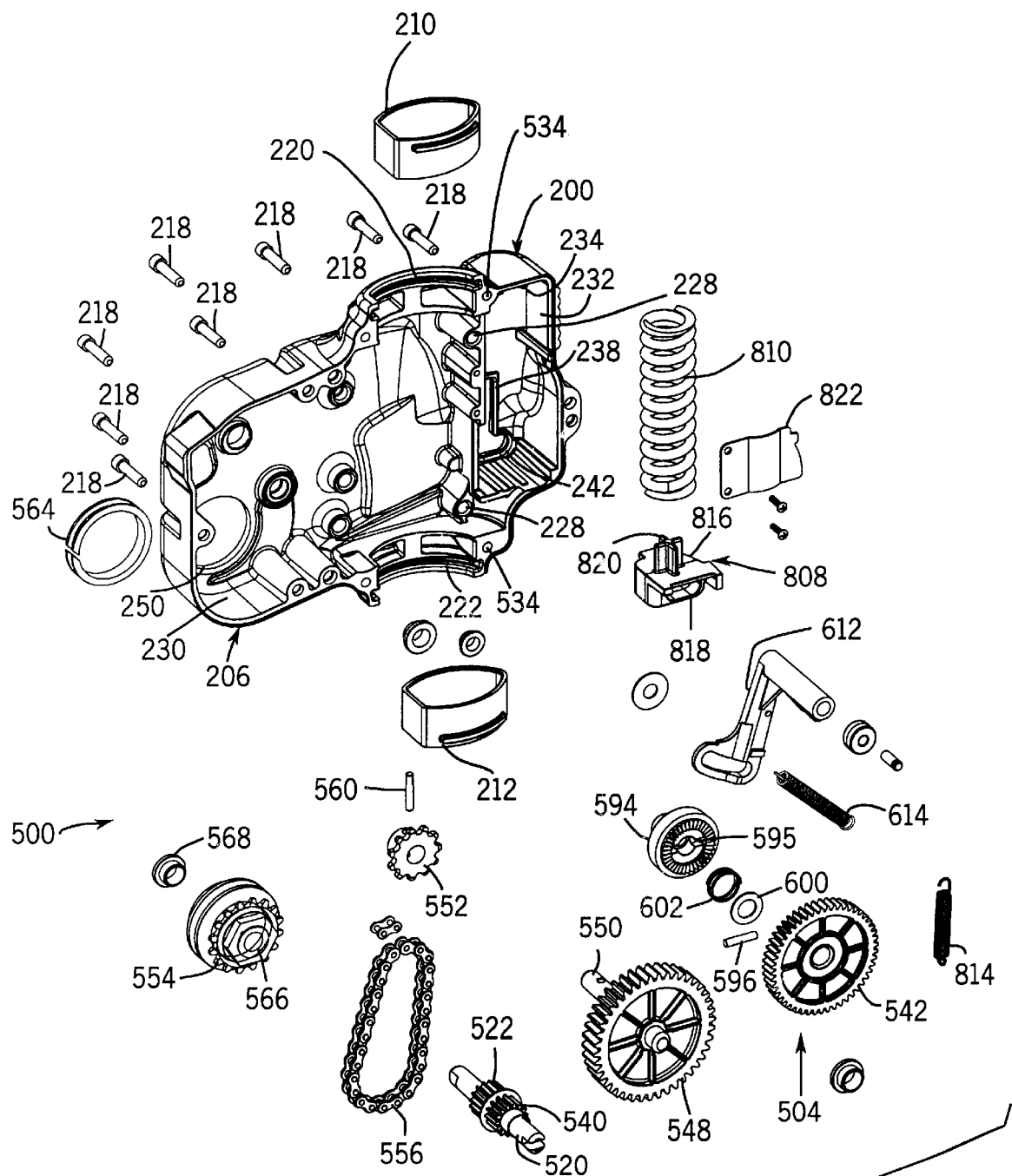
FIGS. 11 and 12 are exploded perspective views of a housing, drive system and impact protection system of the trolling motor system of FIG. 1.
Figure 12:
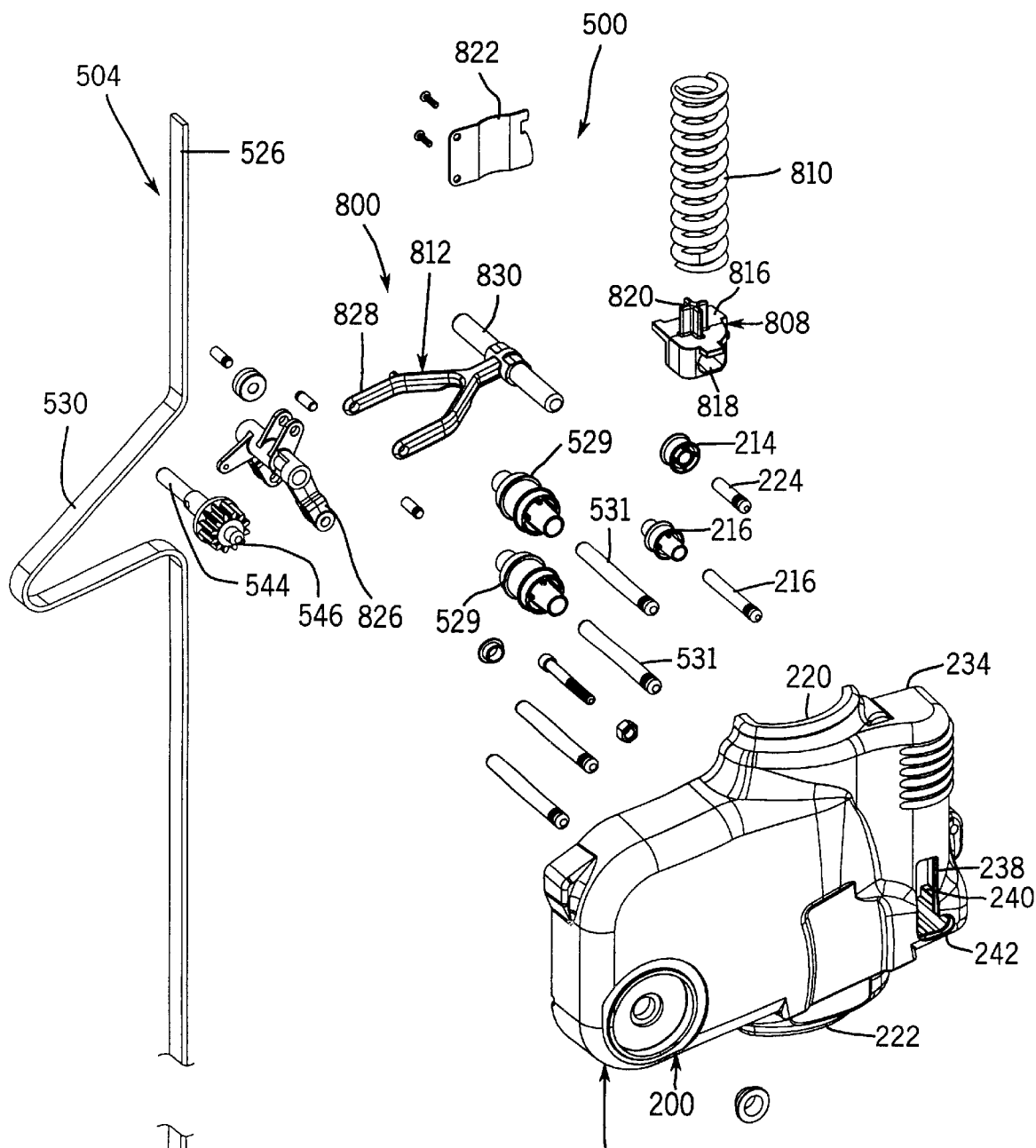

FIGS. 11, 12, 22 and 23 illustrate housing 200 in greater detail. FIGS. 11 and 12 are exploded views of housing 200. As shown in FIGS. 11 and 12, housing 200 generally includes halves 206, 208, upper bearing sleeve 210, lower bearing sleeve 212 and guide rollers 214, 216. Halves 206 and 208 are joined to one another about drive system 500, impact protection system 800, and about shaft support 300 (all shown in FIG. 22) by fasteners 218. When joined together, halves 206 and 208 form upper opening 220 and lower opening 222 through which shaft support 300 extends. Upper bearing sleeve 210 mounts within opening 220 between halves 206, 208 while lower bearing sleeve 212 mounts within opening 222 between halves 206, 208. Upper and lower bearing sleeves 210, 212 receive and slidably guide movement of shaft support 300 along axis 202.

Guide rollers 214 and 216 are rotatably supported between halves 206 and 208 by axles 224, 226, respectively, received within corresponding pair of aligned openings 228 in halves 206 and 208. Guide rollers 214 and 216 guide movement of shaft support 300 between sleeves 210 and 212.

As further shown by FIG. 11, halves 206 and 208 of housing 200 define a first interior chamber 230 for receiving drive system 500 and a second chamber 232 for receiving impact protection system 800. Adjacent to chamber 232, housing 200 includes a pair of side-by-side engagement surfaces 234 which interact with impact protection system 800 (as described in greater detail hereafter) to absorb energy during impact with underwater obstructions. Housing 200 further includes a pair of opposing openings or slots 238 including a vertical portion 240 and a horizontal portion 242. As will be discussed in greater detail hereafter, slots 238 accommodate movement of impact protection system 800 during collisions with underwater obstructions and as housing 200 is pivoted about axis 106 to the stowed position.

SHAFT SUPPORT

Figure 13:
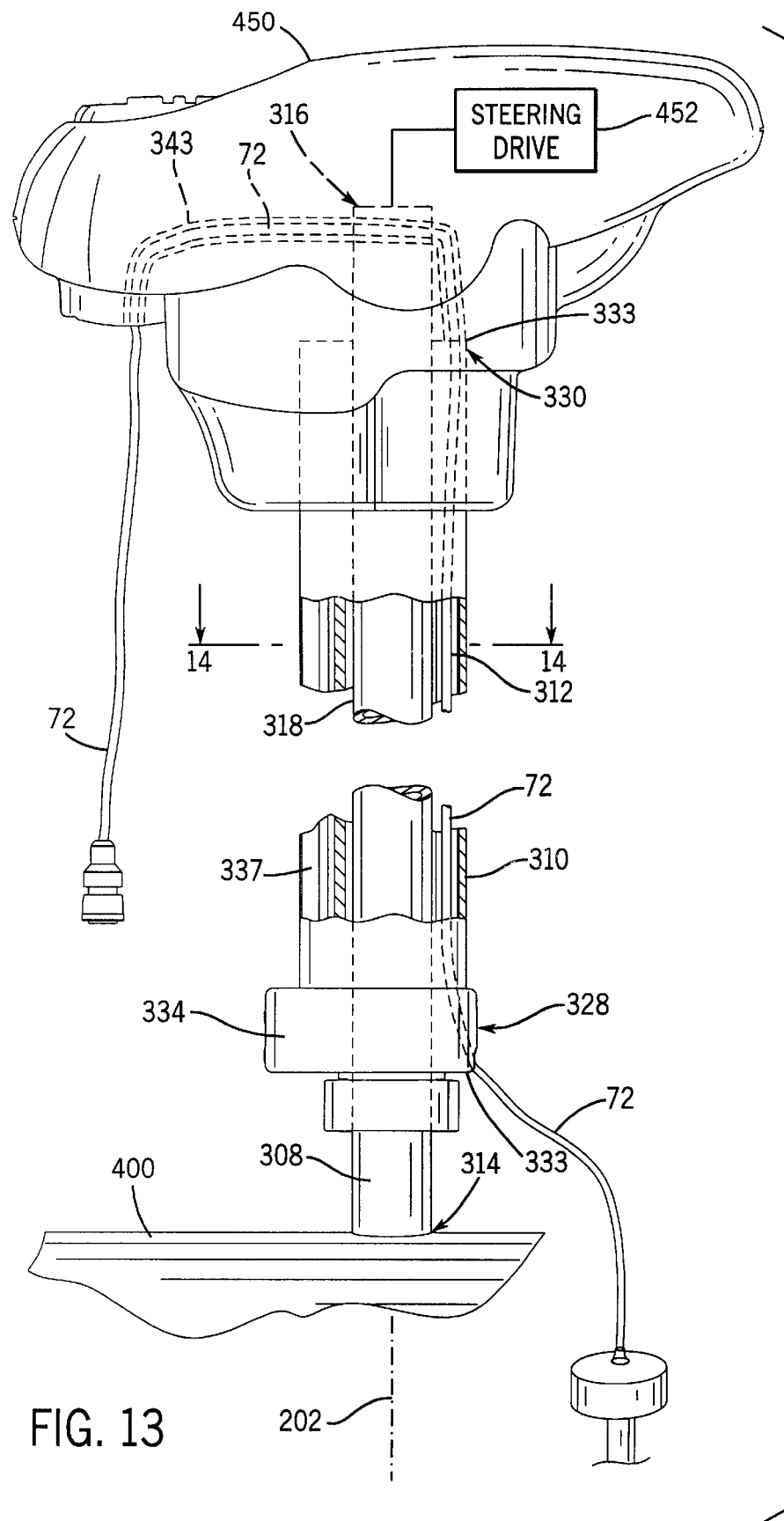
FIG. 13 is a fragmentary side elevational view of a shaft support of the trolling motor system of FIG. 1 with portions removed for purposes of illustration.
Figure 14:
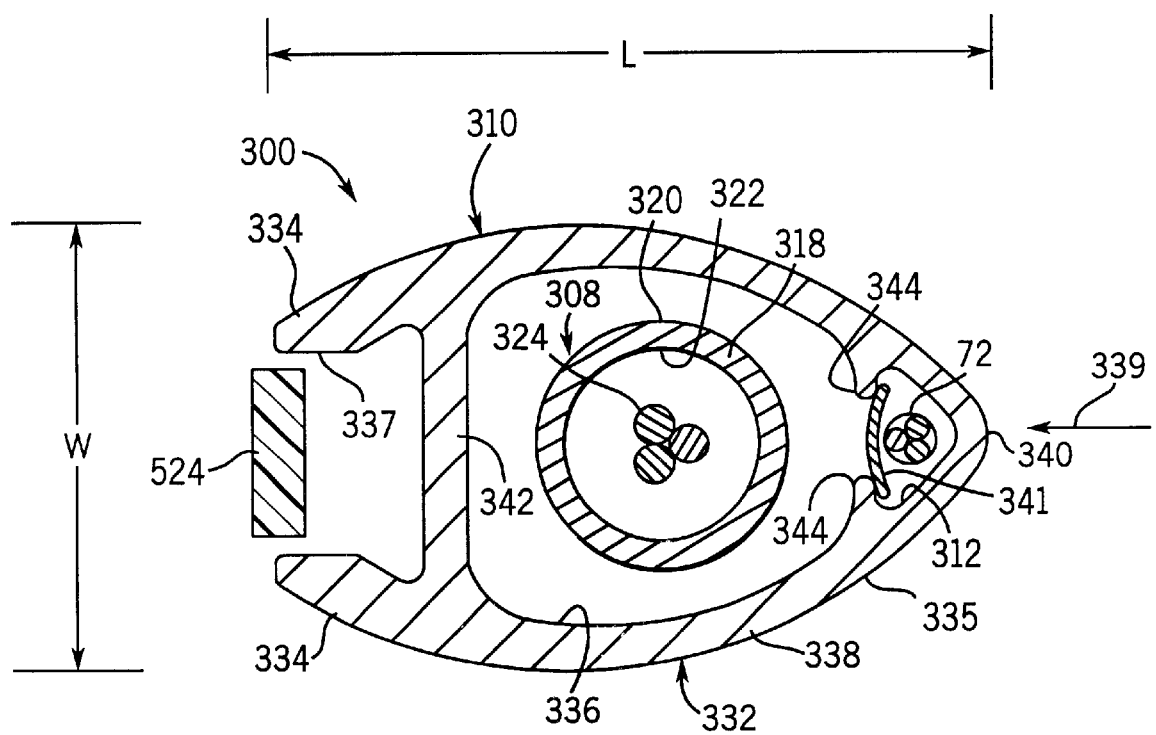
FIG. 14 is a sectional view of the shaft support of FIG. 13 taken along lines 14—14.

FIGS. 13 and 14 illustrate shaft support 300 in greater detail. As shown by FIG. 13, shaft support 300 generally includes an inner shaft 308, an outer shaft 310 and a passageway 312. Inner shaft 308 extends along axis 202 from a first lower end 314 fixed to lower propulsion unit 400 to an opposite end 316 coupled to steering drive 452 (schematically shown) of head 450. Steering drive 452 is conventionally known and is configured to rotatably drive inner shaft 308 about axis 202 (axis 202 being defined as extending through the center of inner shaft 308).

As best shown by FIG. 14, inner shaft 308 has a wall 318 having an exterior surface 320 forming a hollow interior 322. Wall 318 and interior 322 have a generally circular cross-section and rotatably fit within outer shaft 310. Wires or electrical lines 324 extend through interior 322 from the interior of propulsion unit 400 to the interior of head 450. Lines 324 transmit energy and control signals to propulsion unit 400 from head 450 and from foot control 900.

As shown by FIG. 13, outer shaft 310 is an elongate hollow tubular member extending from a first end 328 proximate to end 314 of shaft 308 to a second end 330 proximate to end 316 of shaft 308. In the exemplary embodiment, end 330 is positioned adjacent to head 450. As best shown by FIG. 14, outer shaft 310 generally includes wall 332 and side fins 334. Wall 332 has an exterior surface 335 and continuously bounds a hollow interior 336. Wall 332 includes side portions 338 which converge at a point 340 and rear portion 342 opposite point 340. Portions 338 and 340 continuously extend about interior 336 which receives inner shaft 308 and which enables sufficient room for shaft 308 to rotate about axis 202.

Figure 27:
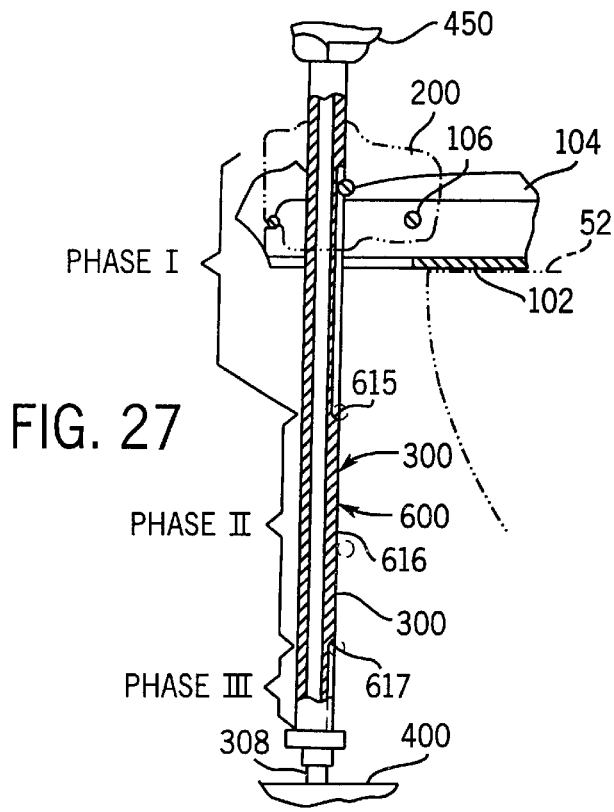
FIG. 27 is a schematic sectional view of the shaft support of the trolling motor of FIG. 1 illustrating a cam along the shaft support.

Fins 334 comprise longitudinally extending ribs which bound an axially extending rear channel 337. Rear channel 337 is configured to receive components of drive system 500. In particular, rear channel 337 receives and protects cam 610 (as shown in FIG. 27) and driven member 524 which is at least partially recessed therein. Fins 334 further align and protect member 524 as outer shaft 310 is being moved along axis 202.

As further shown by FIG. 14, outer shaft 310 and inner shaft 308 cooperate to form a dual-walled structure which is sufficiently flexible to minimize damage caused by collisions with underwater obstructions. Inner shaft 308 and outer shaft 310 are preferably formed from a strong yet flexible material. Preferably, inner shaft 308 and outer shaft 310 are formed from a pultruded composite material composed of linear glass fibers. Alternatively, inner shaft 308 and outer shaft 310 may be formed from pultruded or extruded fiberglass materials, polymers or metals. As will be appreciated, the particular material chosen for inner shaft 308 and outer shaft 310 may be varied depending upon the use of trolling motor system 50 and its desired durability. Moreover, inner shaft 308 and outer shaft 310 may alternatively be formed from different materials and have different relative wall thicknesses. Shafts 308 and 310, in conjunction with impact protection system 800, enable trolling motor system 50 to withstand impacts with underwater objects with minimal damage to the overall shaft support 300, bow mount system 100 or boat 52.

As shown by FIG. 14, outer shaft 310 has a non-circular cross-sectional shape. In particular, outer shaft 310 has a longitudinal length L and a transverse width W. When supported by housing 200 and bow mount system 100 relative to boat 52, the longitudinal length L of outer shaft 310 extends generally parallel to the longitudinal axis of boat 52 extending between its bow and its stern. Because outer shaft 310 has a larger longitudinal length and a smaller transverse width, outer shaft 310 is stronger when encountering impacts in the longitudinal direction as indicated by arrow 339. Because outer shaft 310 is non-rotatably supported along axis 202 by housing 200 and bow mount system 100 generally at bow 56 of boat 52, most collisions with underwater obstructions are likely to occur in the longitudinal direction as indicated by arrow 339. As a result, outer shaft 310 is more robust and resistant during such collisions as compared to conventional circular shafts.

In addition to providing outer shaft 310 with greater resistance and robustness, the non-circular cross-sectional shape of outer shaft 310 also provides room for the formation of passageway 312. As shown by FIG. 13, passageway 312 extends from proximate end 328 of outer shaft 310 to proximate end 330 of outer shaft 310. Passageway 312 includes axial openings 333 through which transducer line 72, preferably comprising one or more wires, is routed. After exiting axial opening 333 at end 330 of outer shaft 310, line 72 is further routed through a secondary passageway 343 (schematically shown) generally defined within the interior of head 450. As best shown by FIG. 14, passageway 312 extends along the length of outer shaft 310 between exterior surface 335 of outer shaft 310 and exterior surface 320 of inner shaft 308. In the exemplary embodiment, passageway 312 is formed in outer shaft 310 and communicates with hollow interior 336 of shaft 310 which receives inner shaft 308. To retain transducer line 72 within passageway 312, wall 332 of outer shaft 310 includes a pair of ribs, claws or constrictions 344 which project towards one another between passageway 312 and interior 336. To further assist in retaining transducer line 72 within passageway 312, an elongate flexible strip 341 can be optionally slid and inserted into passageway 312 against constrictions 344. Alternatively, constrictions 344 may extend closer to one another so as to retain transducer line 72 within passageway 312.

Because passageway 312 communicates with interior 336 along its axial length, passageway 312 may be easily formed as part of outer shaft 310 by an extrusion or pultrusion process. Although less desirable, passageway 312 may alternatively be continuously bounded about its center. Although less desirable, passageway 312 may alternatively be formed by a separate tubular member between inner shaft 308 and outer shaft 310. Passageway 312 may also be integrally formed as part of or secured to an exterior surface of inner shaft 308. Moreover, although passageway 312 is illustrated as extending along substantially the entire axial length of outer shaft 310, passageway 312 may alternatively be provided by a plurality of axially spaced tubular sections or constricted sections along interior 336. In such an alternative embodiment, transducer line 72 is protected and enclosed by the exterior surface 335 and yet partially exposed adjacent to interior 336. In yet another alternative embodiment, the passageway 312 may be formed by one or more separate tubular members or by one or more members having constrictions or inwardly extending claws which are fastened, adhered or otherwise affixed to and axially along interior 336 of shaft 310. Although shaft 310 is generally illustrated as having a cross-sectional shape of a nose cone or triangle, outer shaft 310 may have other alternative noncircular cross-sectional shapes which define a longitudinal length L greater than a transfer width W and which provide sufficient room for the provision of passageway 312. Because outer shaft 310 is provided with a nose cone or triangular cross-sectional shape, outer shaft 310 is sleek and aesthetically attractive when employed as part of trolling motor system 50.

Figure 15:
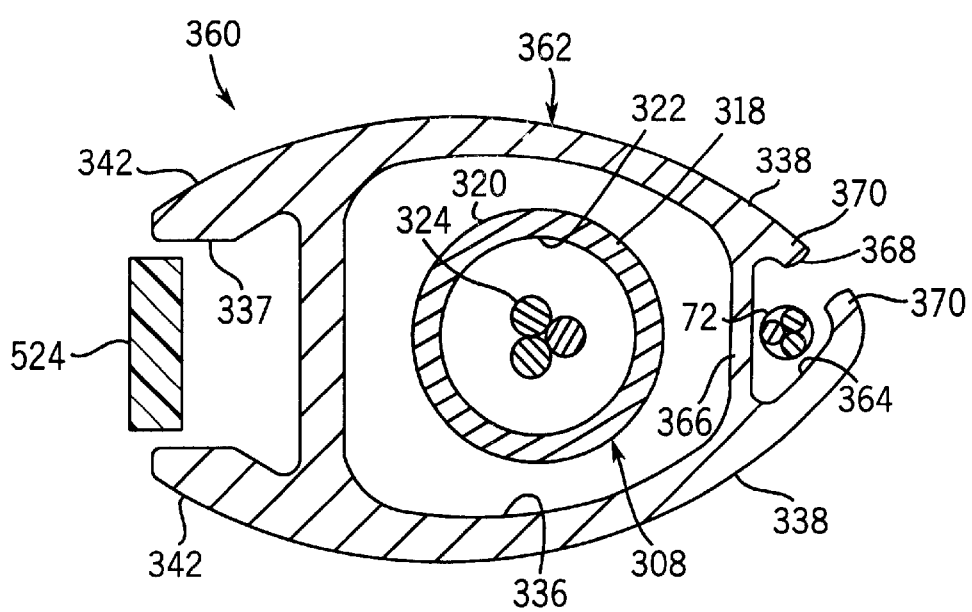
FIG. 15 is a sectional view of an alternative embodiment of the shaft support of FIG. 13.
Figure 21:
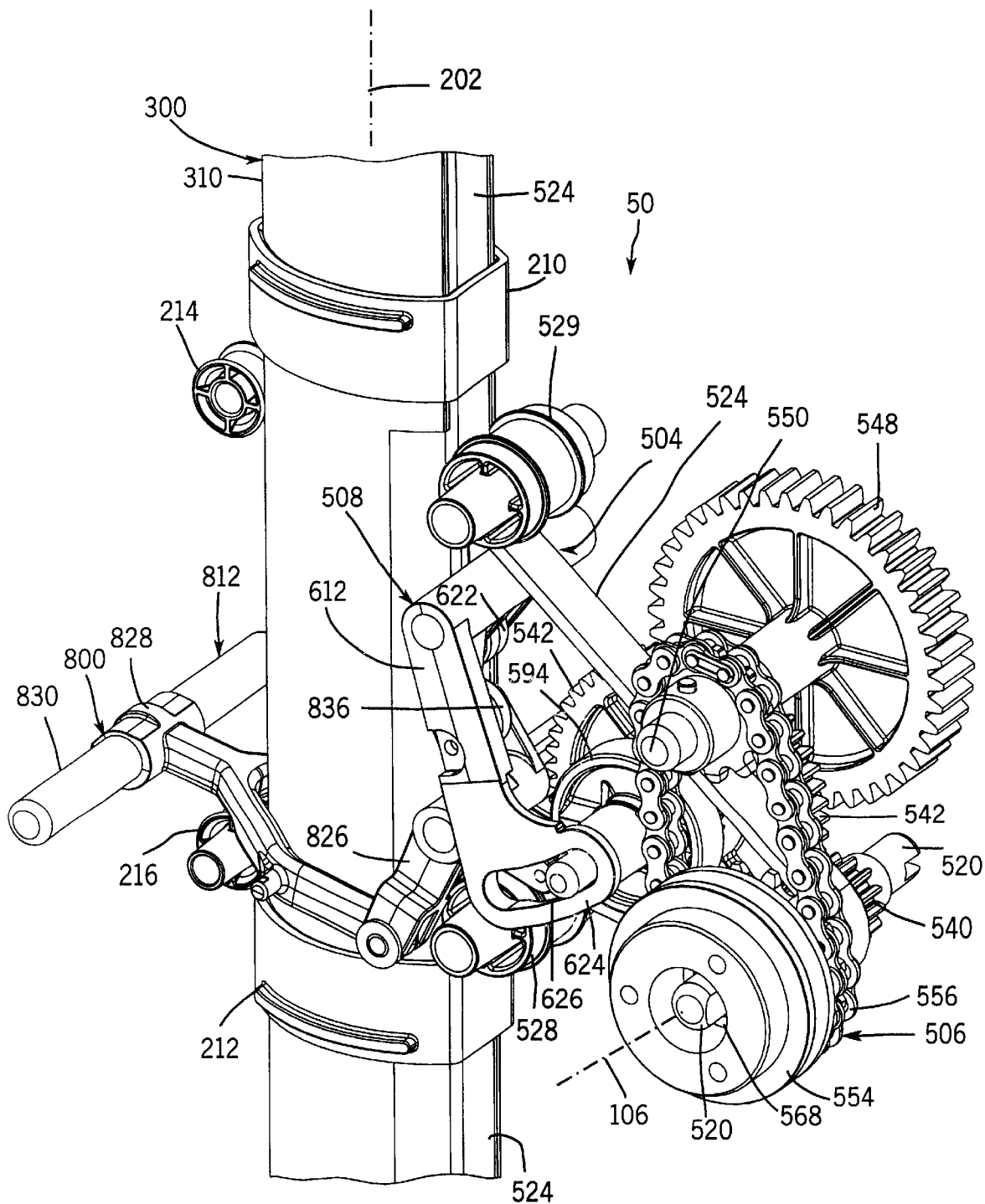
FIG. 21 is a perspective view of the drive system of FIG. 1 assembled and supported by a housing adjacent to a shaft support with selected portions removed for purposes of illustration.

FIG. 15 is a sectional view of shaft 360, an alternative embodiment of shaft support 300. Shaft support 360 is similar to shaft support 300 except that shaft support 360 includes outer shaft 362 in lieu of outer shaft 310. For reasons of illustration, those remaining elements of shaft support 360 which correspond to shaft support 300 are numbered similarly. Outer shaft 362 is itself similar to outer shaft 310 except that outer shaft 362 includes wall portion 366 and constrictions 370 in lieu of constrictions 344. Wall portion 366 extends between side portion 338 adjacent to interior 336. Constrictions 370 extend in front of wall portion 366 and cooperate with wall portion 366 to define passageway 364 in lieu of passageway 312. Passageway 364 extends along substantially the entire axial length of outer shaft 362 and end 328 to end 330 and is sized to receive transducer line 72. Passageway 364 is separated from interior 336 by intermediate wall portion 366 and communicates with the environment around outer wall 332 through an elongate slit 368 formed by constrictions 370. Slit 368 preferable has a width between constrictions 370 slightly smaller that the size of transducer line 72. As a result, transducer line 72 resiliently compresses during insertion into passageway 364 and then expands to its original shape so as to be retained within passageway 364. Because slit 368 enables passageway 364 to communicate with the exterior of outer shaft 362, slit 368 enables line 72 to be simply pushed sideways through slit 368 into passageway 364 along the entire axial length of outer shaft 362. As a result, line 72 does not need to be threaded through axial openings of passageway 364. In the exemplary embodiment, constriction 370 are formed of the same material as the remainder of outer shaft 362. Alternatively, constrictions 370 my be co-molded or otherwise attached to outer shaft 362 and may be formed from a material having a greater resiliency or flexibility to facilitate insertion of line 72 into passageway 364. Although passageway 364 is illustrated as being provided along the longitudinal center line of outer shaft 362, passageway 364 may alternatively be provided along the transverse sides or rear portions of outer shaft 362. Moreover, slit 368 may extend through wall 332 at a variety of alternative locations.

Overall, outer shafts 310 and 362 guide and protect the wire line or bundled wire line of underwater sonar system 54 without twisting of the line 72 and without occupying valuable internal space within interior 322. At the same time, shafts 310 and 362 allow after market underwater sonar system 54 to be easily employed with trolling motor system 50 since line 72 may be easily routed through outer shaft 310, 362 without substantially disassembly of trolling motor system 50. In addition, outer shafts 310 and 362 are stronger and more robust during impact with underwater obstructions as compared to conventional trolling motor shafts having circular cross-sections.

DRIVE SYSTEM

FIG. 16 schematically illustrates drive system 500 as well as chassis 104, housing 200, shaft support 300, propulsion unit 400 and steering drive 452. As shown by FIG. 16, drive system 500 includes actuator 502 (shown in FIG. 25), linear drive 504, pivot drive 506, coupler 508 and shaft position detector 510. Actuator 502 preferably comprises a rotary actuator coupled to linear drive 504 and selectively coupleable to pivot drive 506 via coupler 508. Actuator 502 provides power, in the form of torque, to linear drive 504 and pivot drive 506.

Linear drive 504 is continuously coupled to actuator 502 and engages shaft support 300 to move shaft support 300 and propulsion unit 400 along axis 202 relative to housing 200. Pivot drive 506 is coupled to housing 202 and is configured to pivot housing 200 about axis 106 upon being driven by rotary actuator 502. Shaft position detector 510 is coupled to coupler 508 and is configured to detect the positions of shaft support 300 and/or propulsion unit 400 along axis 202. Coupler 508 is operably coupled between actuator 502 and pivot drive 506. Coupler 508 is actuatable between a connected position and a disconnected position based upon the position of shaft support 300 along axis 202 and relative to housing 200 as detected by detector 510. In the connected position, coupler 508 connects actuator 502 to pivot drive 506 to pivot housing 200 about axis 106. In the disconnected position, actuator 502 and pivot drive 506 are disconnected.

In operation, drive system 500 actuates shaft support 300 and propulsion unit 400 between a deployed position to a stowed position employing three phases. In Phase I, drive system 500 moves shaft support 300 and propulsion unit 400 solely along axis 202 in a generally vertical direction. This is accomplished by actuator 502 driving linear drive 504 which engages and moves shaft support 300 relative to housing 200 while coupler 508 is in the disconnected position. Phase I is illustrated in FIGS. 17 and 18 which depict shaft support 300 and propulsion unit 400 being lifted along axis 202.

In Phase II, drive system 500 pivots housing 200, shaft support 300 and propulsion unit 400 about axis 106 from a vertical orientation to a substantially horizontal orientation. This is accomplished by coupler 508 operably connecting actuator 502 to pivot drive 506. In the exemplary embodiment, actuator 502 continues to drive linear drive 504 during Phase II to continue moving shaft support 300 and propulsion unit 400 along axis 202 of shaft support 300 relative to housing 200 even as housing 200 is pivoting about axis 106. Alternatively, actuator 502 may be temporarily disconnected from linear drive 504 to cessate the movement of shaft support 300 along axis 202 during such pivoting. Phase II is best illustrated in FIG. 19. As further shown by FIG. 19, during Phase II, steering drive 452 rotates propulsion unit 400 about axis 202 to insure proper alignment with motor rest 204 of housing 200. Although less desirable, rotation of propulsion unit 400 about axis 202 may alternatively be omitted in applications where propulsion unit 400 is not to be positioned upon motor rest 204.

FIG. 20 illustrates Phase III. During Phase III, drive system 500 continues to move propulsion unit 400 and shaft support 300 along axis 202 relative to housing 200 in a generally horizontal direction as indicated by arrow 522. This is accomplished by coupler 508 being in the disconnected position such that pivot drive 506 is no longer driven. As a result, linear drive 504 continues to move shaft support 300 and propulsion unit 400 along axis 202 until propulsion unit 400 rests upon motor rest 204.

Initiation and termination of Phases I, II and III are controlled based upon the position of shaft support 300 along axis 202 as detected by detector 510. As will be described in greater detail hereafter, shaft position detector 510 preferably comprises a mechanical detection apparatus employing a cam along shaft support 300 and a cam follower coupled to coupler 508 and extending adjacent to the cam. Alternatively, shaft position detector 510 comprises a sensor configured to detect at least one position of shaft support 300 along axis 202 and a control circuit coupled to the sensor and coupler 508 such that coupler 508 actuates between the connected and disconnected positions in response to the control signals generated by the sensor and the control circuit. This sensor may comprise a photo eye detector, a micro switch or any of a variety of alternative sensors configured to detect the presence or location of an object. In embodiments where coupler 508 does not itself include an actuator moving coupler 508 between the connected and disconnected positions, the sensor and the control circuit may alternatively be coupled to an actuator which is in turn coupled to the coupler 508, whereby the actuator actuates coupler 508 between the connected and disconnected positions in response to control signals from the sensor and the control circuit. As contemplated herein, the sensing of the position of shaft support 300 along axis 202 also encompasses sensing those components attached to or carried by shaft support 300. Although less desirable, in lieu of shaft position detector 510, drive system 500 may alternatively include the control circuit or other electronic or computer hardware or software configured to control coupler 508 based upon stored time values representing the desired length of each phase or may employ mechanical timing devices such as timing belts and the like to control coupler 508 for switching between Phase I, Phase II and the optional Phase III.

FIGS. 11–12 and 21–31 illustrate a first exemplary embodiment of drive system 500 schematically illustrated in FIG. 16. Drive system 500 generally includes rotary actuator 502, linear drive 504, pivot drive 506, coupler 508 and shaft position detector 510.

Figure 25:
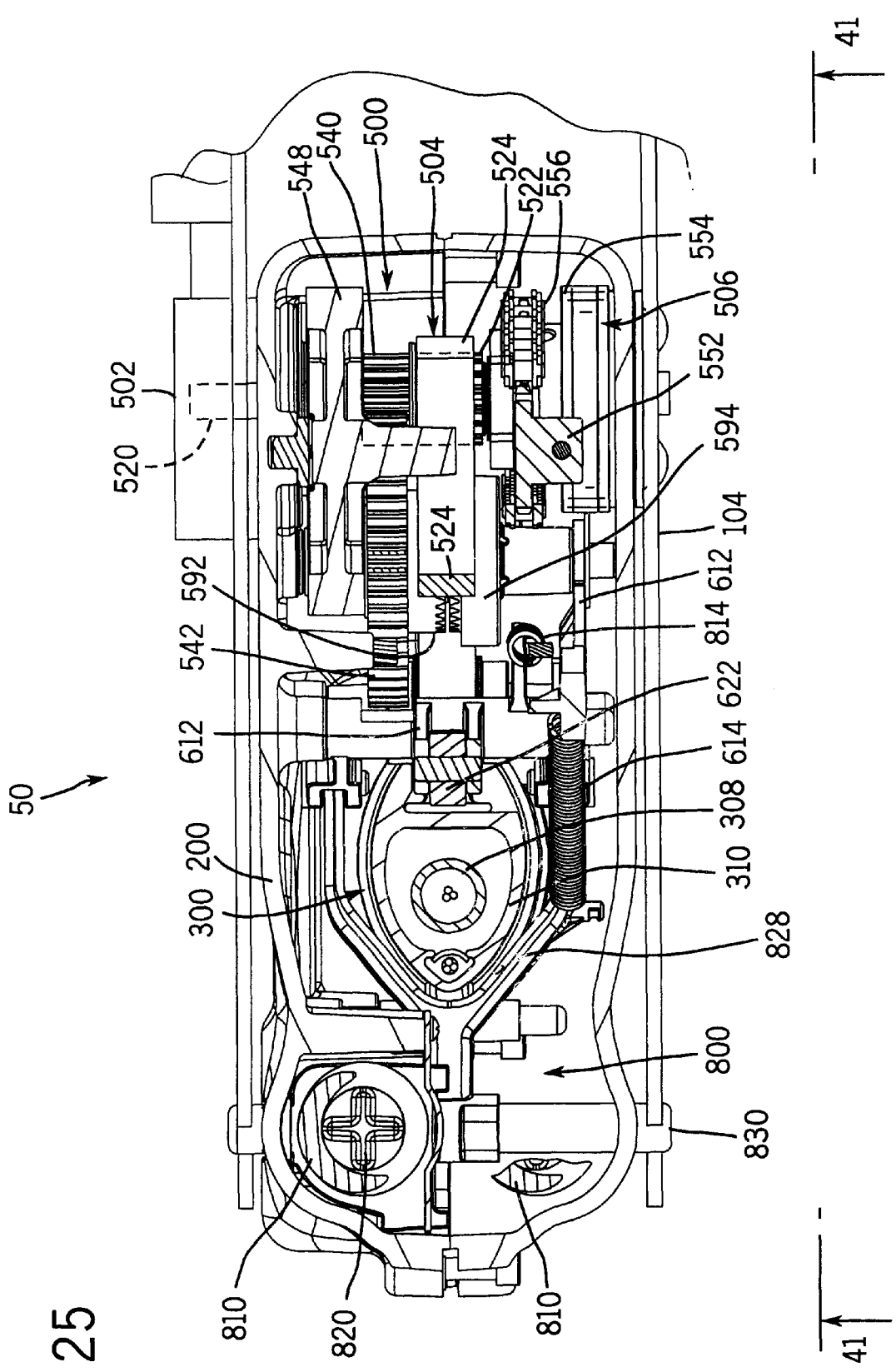
FIG. 25 is a sectional view of the unit of FIG. 22 taken along lines 25—25.

Rotary actuator 502 is shown in FIG. 25. Rotary actuator 502 comprises a conventionally known window lift motor. Alternatively, other rotary actuators, whether pneumatic, electric, or mechanical, may be employed in lieu of rotary actuator 502.

Linear drive 504 generally includes input shaft 520, drive member 522, and elongate driven member 524. Input shaft 520 is coupled to and extends from actuator 502 along axis 106 and is drivenly coupled to drive member 522. Drive member 522 is configured to be rotatably driven about axis 106 by actuator 502 and in engagement with elongate driven member 524. Elongate driven member 524 has a first portion 526 secured to outer shaft 310 at a first point, a second portion 528 axially spaced from first portion 526 and coupled to outer shaft 310 at a second point, and a third portion 530 between first portion 526 and second portion 528. Member 524 is coupled to drive member 522 such that rotation of drive member 522 moves outer shaft 310, shaft support 300 and propulsion unit 400 along axis 202. In the exemplary embodiment, drive member 522 comprises a pinion gear carried by input shaft 520 while driven member 524 comprises a toothed belt. Alternatively, drive member 522 may comprise a pulley, wherein driven member 524 comprises a belt. Drive member 522 may also comprise a sprocket, wherein driven member 524 comprises a chain. In yet another alternative embodiment, drive member 522 may comprise a pinion gear or a worm gear, wherein driven member 524 comprises a rack gear.

In the exemplary embodiment where driven member 524 comprises a belt, idlers 529 maintain driven member 524 recessed within channel 337 of outer shaft 310 above and below housing 200. Idlers 529 are rotatably coupled to housing 200 by axles 531, which are secured within opening 534 of housing 200 (shown in FIG. 11).

Pivot drive 506 generally includes input shaft 520, pinion gear 540, pinion gear 542, shaft 544, pinion gear 546, pinion gear 548, shaft 550, first pivot member 552, second pivot member 554 and flexible member 556. Input shaft 520 is coupled to actuator 502 and also transmits torque from actuator 502 to pivot drive 506. In addition to carrying drive member 522, input shaft 520 carries pinion gear 540 which is in intermeshing engagement with pinion gear 542. Pinion gear 542 is rotatably supported relative to housing 200 by shaft 544 and about the axis of shaft 544 relative to pinion gear 546. Pinion gear 546 is non-rotatably coupled to shaft 544 and in intermeshing engagement with pinion gear 548. Pinion gear 548 is rotatably supported relative to housing 200 and is non-rotatably secured and carried by shaft 550 which is non-rotatably coupled to first pivot member 552. First pivot member 552 is rotatably supported relative to housing 200 by shaft 550. In the exemplary embodiment, first pivot member 552 is pinned to shaft 550 by means of pin 560. First pivot member 552 is operably engaged with second pivot member 554 by flexible member 556. Second pivot member 554 extends through housing 200 and is fixed to chassis 104 by fasteners 562 (shown in FIGS. 21 and 30). As shown in FIG. 11, a bearing member 564 is positioned within opening 250 of housing 200 to facilitate rotation of housing 200 about axis 106 and about second pivot member 554. As further shown by FIG. 11, second pivot member 554 includes an opening 566 into which an end of input shaft 520 is rotatably journalled and axially secured in place by ring 568.

In the exemplary embodiment, the first and second pivot members comprise sprockets while endless member 556 comprises a chain. Alternatively, first and second pivot members 552 and 554 may comprise pulleys or gears, wherein endless member 556 comprises a belt or tooth belt, respectively. Moreover, endless member 556 may be omitted where first pivot member 552 is in direct operable engagement with second pivot member 554. For example, first and second pivot members 552 and 554 may alternatively comprise intermeshing gears or gears interconnected by intermediate gears.

During Phases I and III, input gear 520 drives pinion gear 540 which drives pinion gear 542. Gear 542 freely spins about shaft 544 when coupler 508 is in the disconnected position. During Phase II in which coupler 508 is in the engaged position, input shaft 520 drives pinion gear 540 which drives pinion gear 542. Pinion gear 542 becomes non-rotatably coupled to shaft 544 via coupler 508 such that gear 542 drives shaft 544 and pinion gear 546. Pinion gear 546 drives pinion gear 548 which in turn drives first pivot member 552 via shaft 550. As first pivot member 552 rotates, first pivot member 552 travels about second pivot member 554 because second pivot member 554 is fixedly secured to chassis 104. As a result, shaft 550, which is journalled to housing 200, also moves about second pivot member 554 and about axis 106 to pivot housing 200 about axis 106.

Coupler 508 is operably coupled between actuator 502 and pivot drive 506. For purposes of this disclosure, the term operably coupled means two members, not necessarily adjacent or in direct contact with one another, in a relationship such that torque or force may be transferred from one to the other. In the exemplary embodiment, coupler 508 indirectly couples the torque transmitted from actuator 502 through gears 540 and 542 to the remainder of pivot drive 506, namely, shaft 544, gear 546, gear 548, shaft 550, first pivot member 552 and second pivot member 554 to effectuate pivoting of housing 200 about axis 106. Coupler 508 generally comprises a clutch assembly including the first clutch half 592 (shown in FIG. 25) and a second clutch half 594. First clutch half 592 is non-rotatably coupled to gear 542. In the exemplary embodiment, first clutch half 592 is integrally formed as a single unitary body with gear 542 and faces second clutch half 594. Second clutch half 594 includes an engaging surface facing first clutch half 592. Second clutch half 594 is non-rotatably coupled to and moveably supported along shaft 544. In the exemplary embodiment, clutch half 592 is keyed to shaft 544 by slot 595 and by pin 596 extending through shaft 544. As further shown by FIG. 11, coupler 508 additionally includes a washer 600 and a spring 602 which are supported along shaft 544 between clutch halves 592 and 594. Spring 602 generally biases clutch half 594 away from clutch half 592 such that coupler 508 is biased towards the disconnected position. Coupler 508 is actuated to the connected position by actuation of clutch half 594 towards and into engagement with clutch half 592. As a result, torque is transmitted from gear 542 through clutch half 592, through clutch half 594 to shaft 544 and to gear 546 of pivot drive 504. The disclosed coupler 508 is preferred due to its reliability, robustness and compactness. However, various other alternative coupling mechanisms for selectively transmitting torque between members may be employed in lieu of clutch halves 592 and 594.

Figure 22:
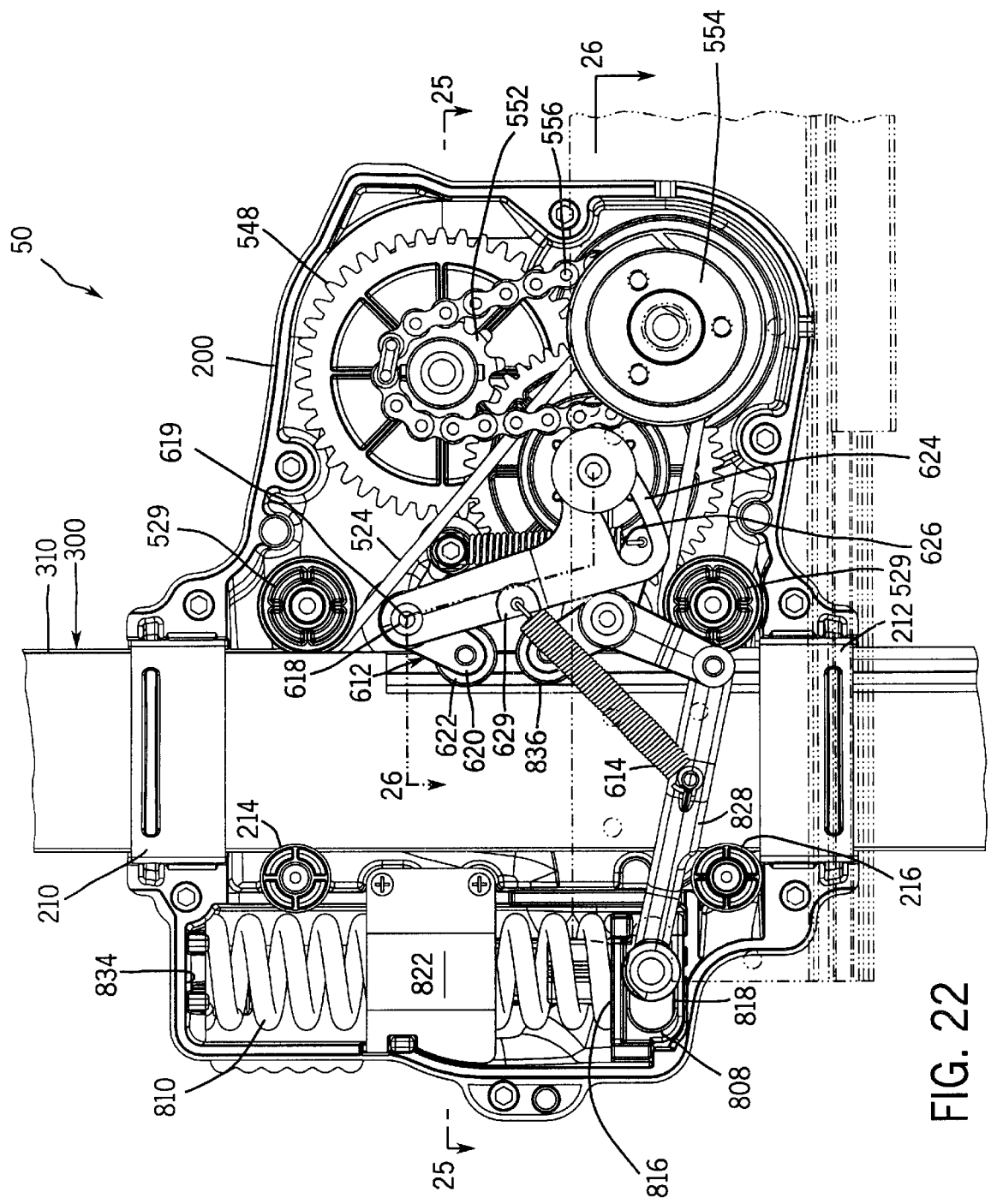
FIG. 22 is a left side elevational view of a housing, a shaft support, a drive system and an impact protection system (collectively referred to as a stow and deploy unit) of the trolling motor system of FIG. 1 with a side of the housing removed for purposes of illustration.
Figure 23:
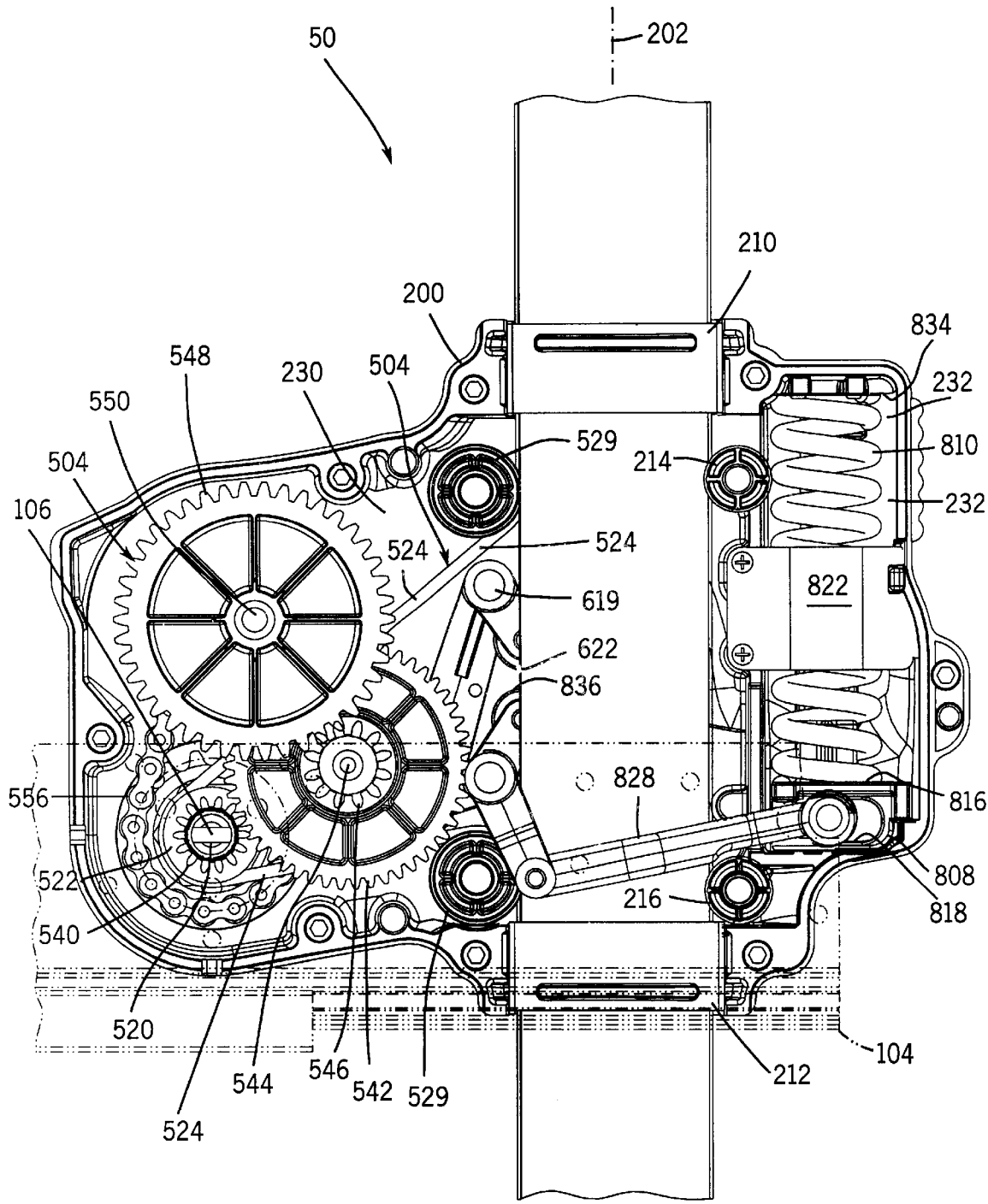
FIG. 23 is a right side elevational view of the unit of the trolling motor system of FIG. 1 with a portion of the housing removed for purposes of illustration.
Figure 24:
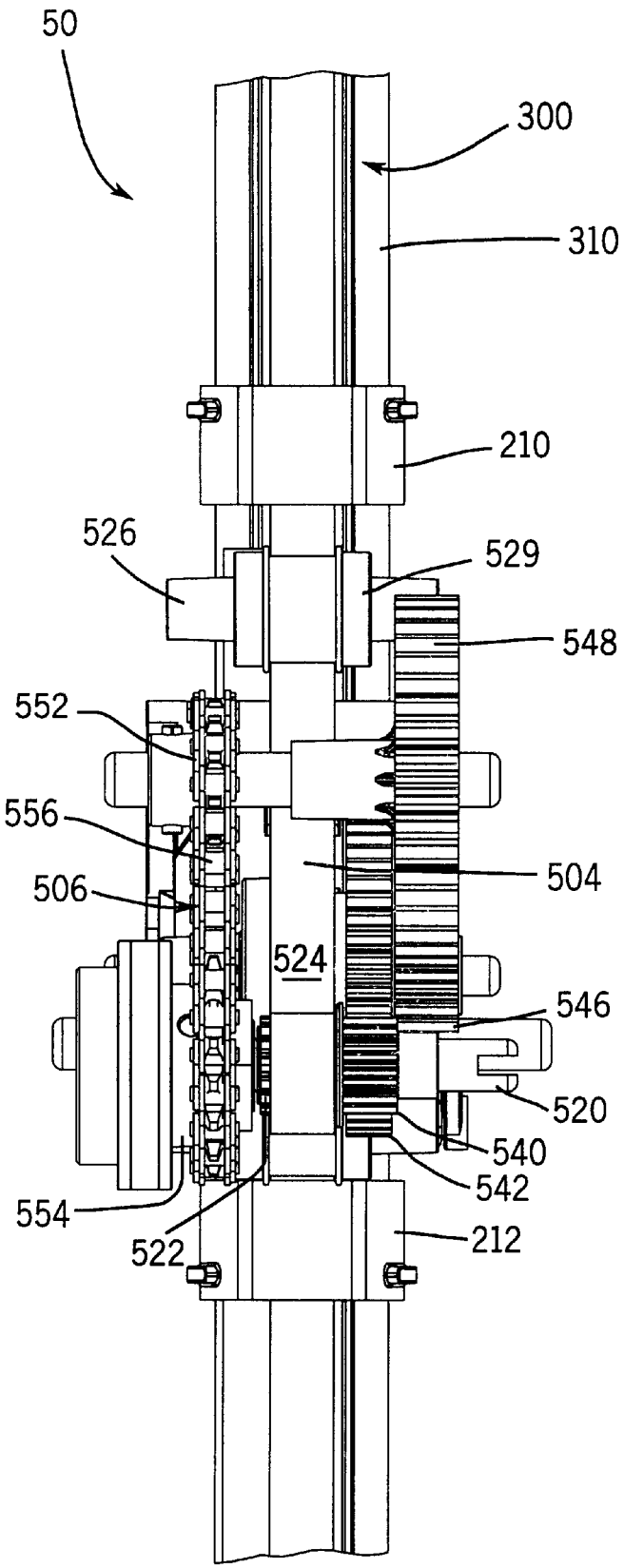
FIG. 24 is a rear elevational view of the unit shown in FIG. 21.

Clutch halves 592 and 594 of coupler 508 are generally moved to the connected position based upon detected position of outer shaft 310 of shaft support 300 along axis 202. Shaft position detector 510 generally includes cam 610 (shown in FIG. 27), cam follower 612 and spring 614. As best shown by FIG. 22, cam follower 612 comprises an elongate Z-shaped member having a first portion 618 pivotally coupled to housing 200 about axis 619, a second portion 620 rotatably coupled to a roller 622 and a third portion 624 having an elongate arcuate slot 626 through which shaft 544 extends into journal engagement with housing 200. As shown by FIG. 26, portion 624 includes an inner beveled surface 628. Spring 614 has one end coupled to an intermediate portion 629 of cam follower 612 and a second opposite end coupled to yoke 828 of impact protection system 800.

In operation, cam follower 612 pivots about axis 619 of portion 618 between a non-actuated state in which beveled surface 628 is withdrawn from clutch half 594 of coupler 508 (shown in FIG. 26) and an actuated state (shown in FIG. 29) in which surface 628 has been moved into engagement with clutch half 594 to move clutch half 594 towards and into engagement with clutch half 592 to thereby move coupler 508 to the connected position. Spring 614 resiliently biases cam follower 612 to the unactuated state. Spring 614 further biases roller 622 against outer shaft 310 of shaft support 300. As outer shaft 310 is moved along axis 202 relative to housing 200 by linear drive 504, cam 610 is brought into engagement with roller 622 which pivots roller 622 in a counterclockwise direction (as seen in FIG. 22) about axis 619 and against the bias of spring 614 to move cam follower 612 to the actuated state (shown in FIG. 29) in which clutch half 594 is urged and maintained in engagement with clutch half 592 such that pivot drive 506 is driven to pivot housing 200 about axis 106.

As shown by FIG. 27, cam 610 generally comprises a variable surface extending along the axial length of outer shaft 310. Cam 610 preferably extends within channel 337 between outer shaft 310 and elongate member 524. Cam 610 generally includes an upper ramp surface 615, a plateau 616 and a lower ramp surface 617. When cam follower 612 is supported above upper ramp 615, drive system 500 is in Phase I. When cam follower 612 extends adjacent to plateau 616, drive system 500 is in Phase II. Finally, when cam follower 612 is positioned below lower ramp 617, drive system 500 is in Phase III.

Overall, FIGS. 22–27 depict drive system 500 in Phase I. As noted above, during Phase I, linear drive 502 is either raising or lowering shaft support 300 along axis 202 of shaft support 300 without any pivoting of housing 200. In particular, during Phase I, roller 622 of cam follower 612 is positioned above upper ramp surface 615 of cam 610 (shown in FIG. 27) such that cam follower 612 is in an unactuated state as shown in FIG. 26. As a result, spring 602 maintains clutch half 594 disengaged from clutch half 592 such that coupler 508 is in the disconnected position. As previously noted, with coupler 508 in the disconnected position, torque from actuator 502 is not transmitted from gear 542 to shaft 544 such that gear 542 freely spins and such that housing 200 is not pivoted.

Figure 28:
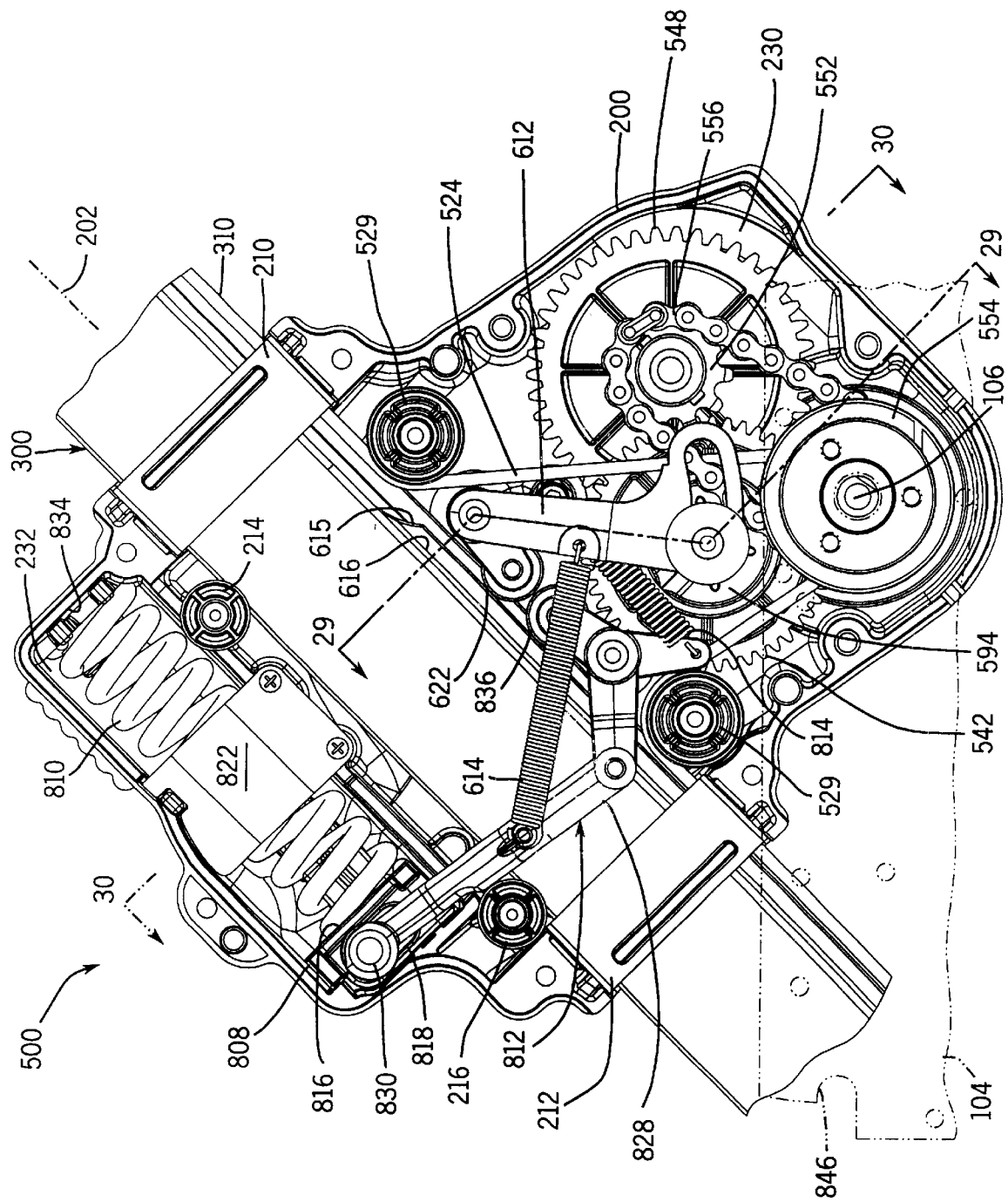
FIG. 28 is a side elevational view of the unit of FIG. 1 during Phase II.
Figure 30:
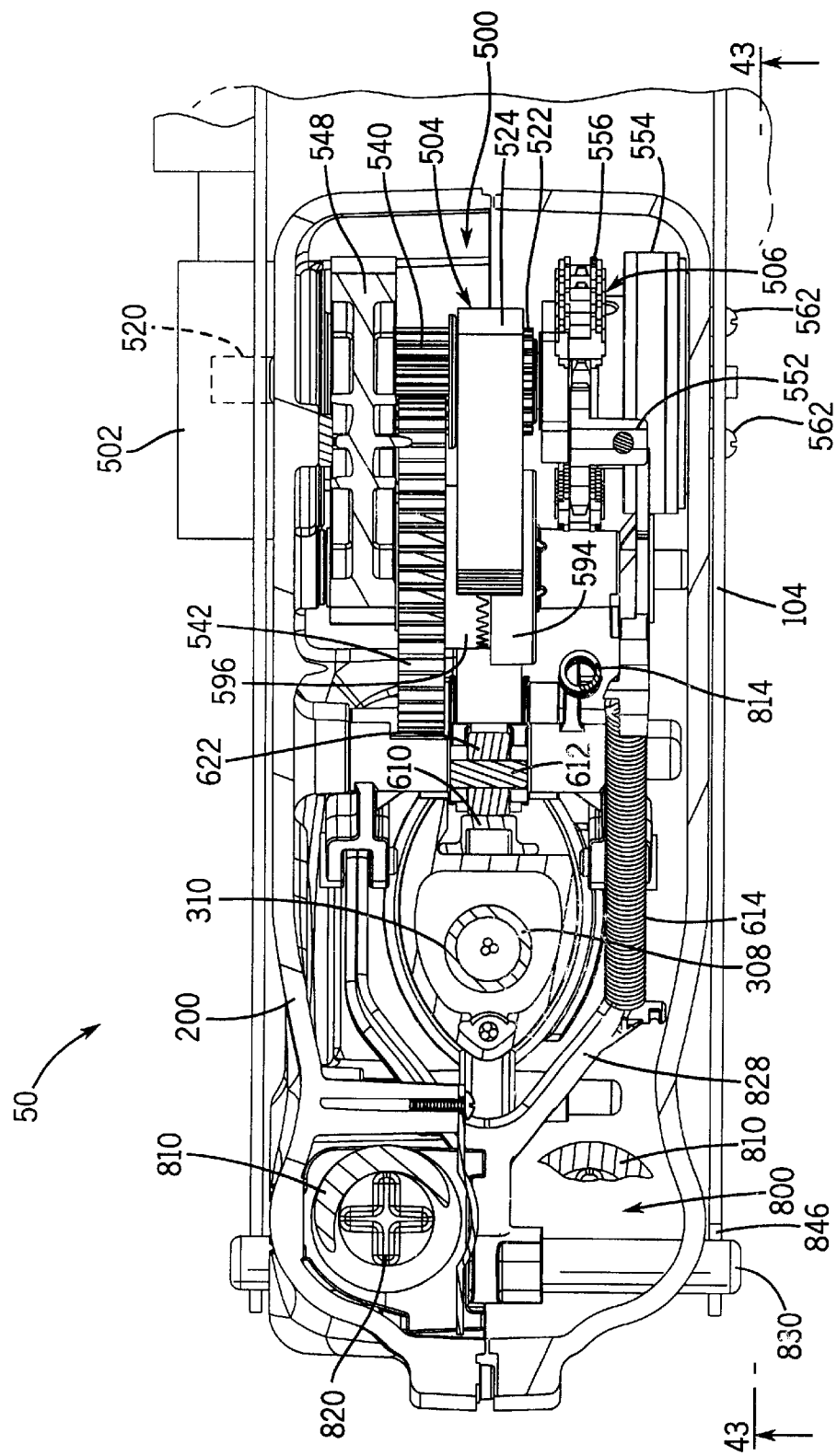
FIG. 30 is a sectional view of the unit of FIG. 28 taken along lines 30—30.

FIGS. 28–30 depict drive system 500 in Phase II in which linear drive 504 continues moving shaft support 300 linearly along axis 202 in either an upward or downward direction depending upon the direction of torque from actuator 502 and in which pivot drive 506 pivots housing 200 about axis 106. As shown in FIG. 27, as outer shaft 310 of shaft support 300 is moved along axis 202, roller 22 rides up upon upper ramp 615 and upon plateau 616. As shown in FIG. 28, as roller 622 rides up upon upper ramp 615, portion 624 is pivoted in a counterclockwise direction to move beveled surface 628 in the direction indicated by arrow 630. Beveled surface 628 forces clutch half 594 against spring 602 along the axis of shaft 544 towards and in the direction indicated by arrow 632 towards and into engagement with clutch half 592. As a result, coupler 508 is now in the connected position such that gear 542 no longer spins but transmits torque to shaft 544 through clutch halves 592 and 594. Shaft 544 rotates to drive gear 546 which drives gear 548 and shaft 550 which rotates first pivot member 552 about second pivot member 554 to pivot housing 200 about axis 106.

Figure 31:
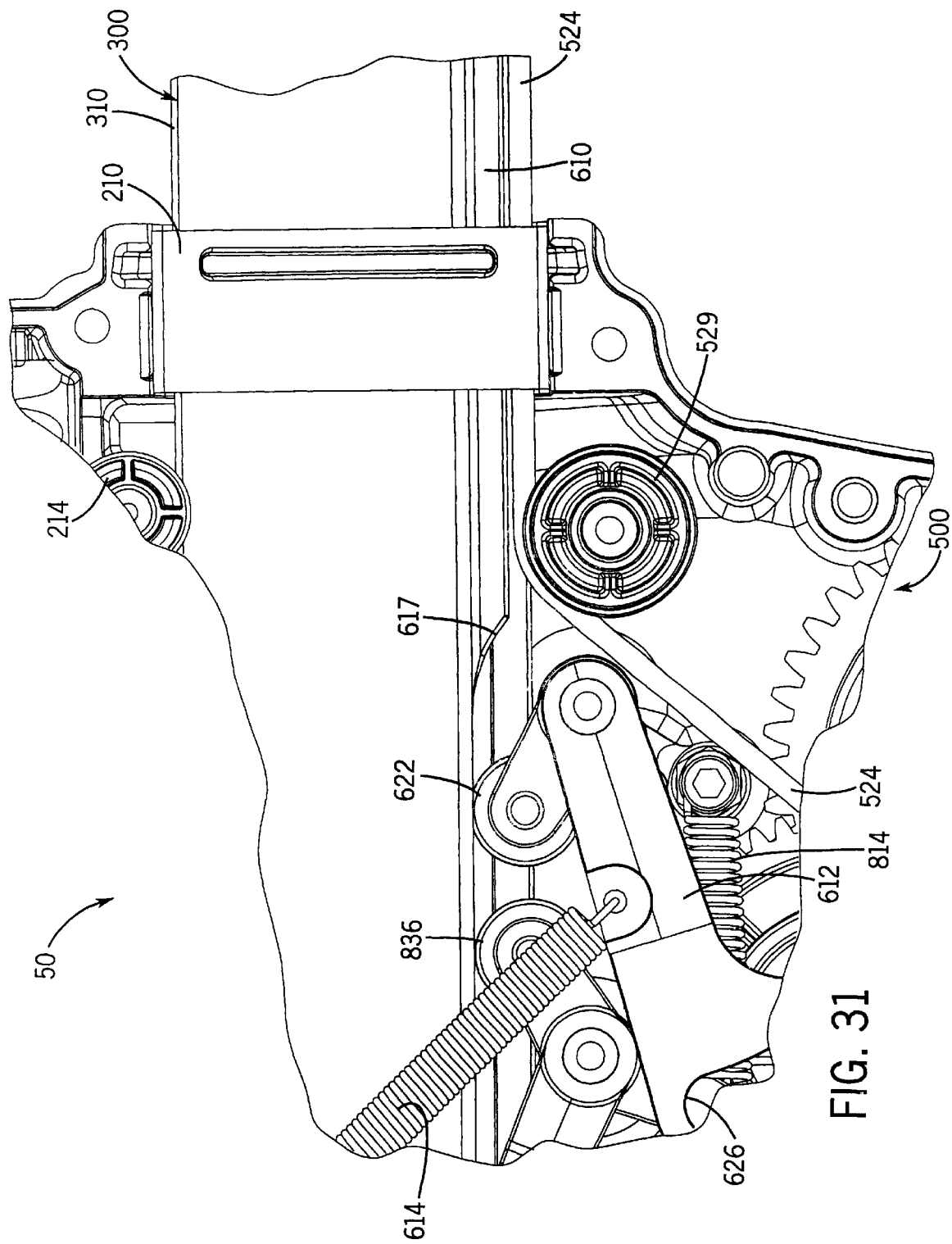
FIG. 31 is a fragmentary side elevational view of the unit in Phase III.

FIG. 31 illustrates drive system 500 in Phase III. As previously noted, during Phase II, drive system 500 is once again linearly moving shaft support 300 along axis 202 without any further pivoting of housing 200 by pivot drive 506. As shown by FIG. 27, during Phase III, roller 22 of cam follower 612 is in engagement with outer shaft 310 below lower ramp 617. As a result, spring 614 is allowed to return cam follower 612 to the unactuated state in which beveled surface 628 is withdrawn out of engagement with clutch half 594 as shown in FIG. 26. Spring 602 separates clutch halves 594 and 592 such that coupler 508 is in the disconnected position and such that gear 542 freely spins relative to shaft 544 under the power of actuator 502.

FIGS. 32–38 schematically illustrate variations of drive system 500. FIG. 32 illustrates drive system 700, an alternative embodiment of drive system 500. Drive system 700 is similar to drive system 500 schematically illustrated in FIG. 16 except that drive system 700 includes separate and distinct actuators 511, 513 for linear drive 504 and pivot drive 506. As with system 500, linear drive 504 continues to move outer shaft 310 of shaft support 300 along axis 202 relative to housing 200 during Phases I, II, and III. Pivot drive 506 also pivots housing 200 relative to chassis 104 about axis 106. However, pivot drive 506 does not couple to the same actuator driving linear drive 504. Instead, shaft position detector either actuates actuator 513 (already coupled to drive 504) so as to begin driving pivot drive 506 or selectively couples via a coupler (not shown) actuator 513 to pivot drive 506 to begin pivoting of housing 200 about axis 106.

FIG. 33 illustrates drive system 710, a second alternative embodiment of drive system 500. Drive system 710 is similar to drive system 500 except that drive system 710 includes linear drive 712 in lieu of linear drive 502. Linear drive 712 generally includes spool 714, flexible member 716 and guide 718. Linear drive 712, upon being powered by its dedicated rotary actuator 502, rotatably drives spool 714 about axis 106 to pull up upon or let out flexible member 716 which has a first end 720 secured to spool 714 and a second opposite end 722 secured to outer shaft 310 of shaft support 300. Guide 718 ensures vertical lifting of shaft support 300 along axis 202. Rotation of spool 714 wraps or unwraps flexible member 716 thereabout to either raise shaft support 300 along axis 202 or to allow gravity to lower shaft support 300 along axis 202. System 710 employs generally the same shaft position detector 510 and pivot drive 506 as drive system 500. System 710 utilizes a coupler 515 such as an actuatable clutch between actuator 513 and pivot drive 506. Coupler 515 transmits the torque generated by actuator 513 to pivot drive 506 in response to the position of shaft support 300 as detected by detector 510.

Figure 34:
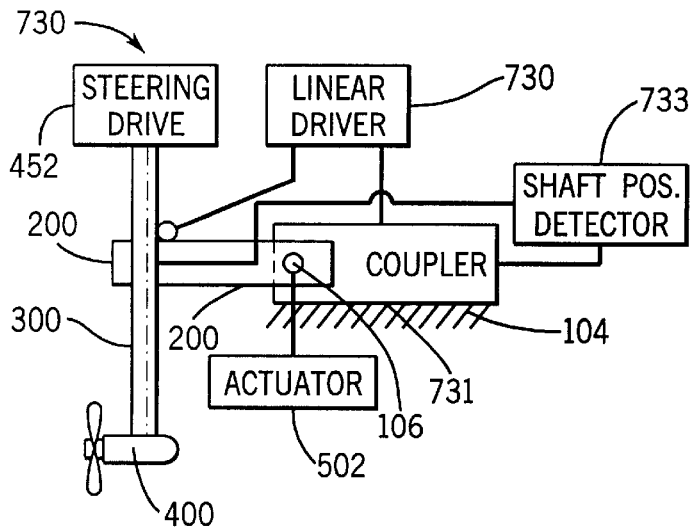
FIG. 34 is a schematic view of a third alternative embodiment of the drive system of FIG. 16.

FIG. 34 illustrates drive system 730. Drive system 730 includes rotary actuator 502, linear drive 730, coupler 731 and shaft position detector 733. Rotary actuator 502 includes a drive shaft which extends through housing 200 into engagement with linear drive 730. Upon being rotatably driven, linear drive 730 moves shaft support 300 and propulsion unit 400 along axis 202. Based upon the detected position of shaft support 300 along axis 202 by shaft position detector 733, coupler 731 disengages actuator 502 from linear drive 730 and directly connects actuator 502 to housing 200. In particular, coupler 731 actuates between an elevating position in which coupler 731 couples the drive shaft to drive 730 to move shaft support 300 along axis 202 and a pivoting position in which coupler 736 couples the same drive shaft of the rotary actuator 502 directly to housing 200 to pivot housing 200 about axis 106. With drive system 730, the linear movement of shaft support 300 along axis 202 and the pivotal movement of housing 200 about axis 106 are selectively done in the alternative, preferably based upon a detected position of shaft support 300 along axis 202 as detected by shaft position detector 510.

Figure 35:
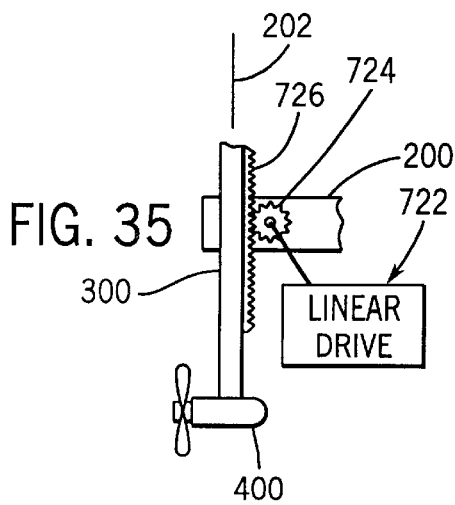
FIGS. 35 and 36 are schematic views of alternative linear drives for the drive system of the trolling motor system of FIG. 1.
Figure 36:
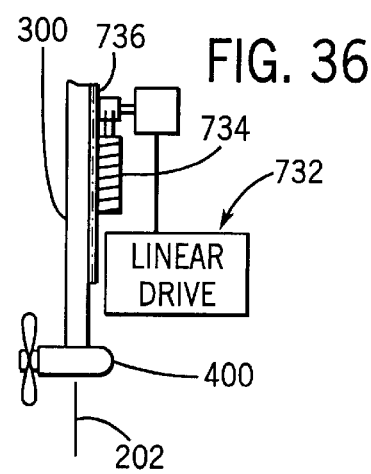

FIGS. 35 and 36 schematically illustrate alternative linear drives. FIG. 35 illustrates linear drive 742 including a pinion gear 724 in engagement with a rack gear 726 to raise and lower shaft support 300. FIG. 36 illustrates linear drive 732 including a worm gear 734 in engagement with rack gear 726. Rotation of worm gear 734 linearly moves shaft support 300 along axis 202.

Figure 37:
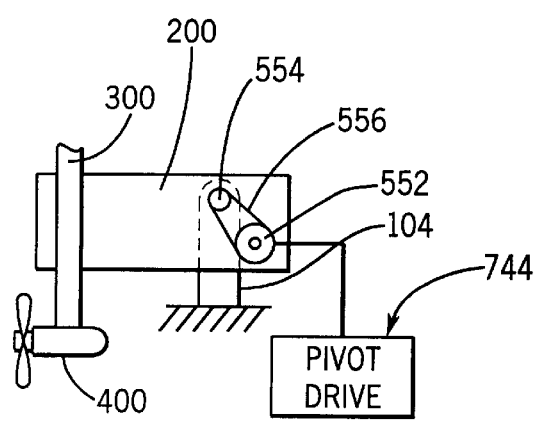
FIGS. 37 and 38 are schematic views of alternative pivot drives for the drive system of the trolling motor system of FIG. 1.
Figure 38:
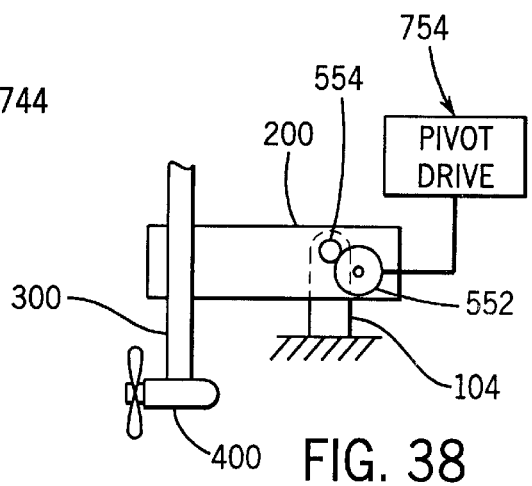

FIGS. 37 and 38 schematically illustrate alternative pivot drives. FIG. 37 illustrates pivot drive 744 in which first pivot member 552 and second pivot member 554 each alternatively comprise one of a pulley or gear and an endless member 556 alternatively comprising one of a belt or toothed belt. FIG. 38 illustrates pivot drive 754 in which endless member 556 is eliminated and in which first pulley member 552 alternatively comprises gears in direct meshing engagement with one another.

IMPACT PROTECTION SYSTEM

FIGS. 11, 12 and 39–43 illustrate impact protection system 800. System 800 generally includes engagement members 808, resilient bias member 810, coupling member 812 and spring 814. Engagement members 808 slidably fit within chamber 232 of housing 200. Each engagement member 808 generally includes an engagement surface 816 and an opening 818. Engagement surface 816 butts against a lower end of resilient member 810 opposite engagement surfaces 234 provided by housing 200. Openings 818 extend below engagement surfaces 816 and receive portions of coupling member 812. Coupling member 812 selectively couples engagement surfaces 816 and engagement members 808 to chassis 104.

Resilient bias members 810 preferably comprise compression springs disposed between engagement surfaces 816 and 234. Resilient bias members 810 extend within chamber 232 along axes substantially parallel to shaft support 300. As a result, impact protection system 800 is simpler and more compact. Resilient bias members 810 are maintained along the respective axes by projections 820 which project upwardly into members 810 from engagement members 808 and by guide plates 822 which are fastened to housing 200 adjacent to intermediate portions of resilient bias members 810.

Coupling member 812 generally includes actuation member 826, yoke 828 and crossbar 830. Actuation member 826 is pivotally coupled to housing about axis 834 and includes a first portion 836 supporting a roller 838 and a second portion 840 pivotally coupled to yoke 828. Yoke 828 extends partially around outer shaft 310 and supports crossbar 830. Crossbar 830 is an elongate rod, bar or other member extending through opening 818 of engagement members 808 and transversely beyond sidewalls 844 of chassis 104.

Figure 41:
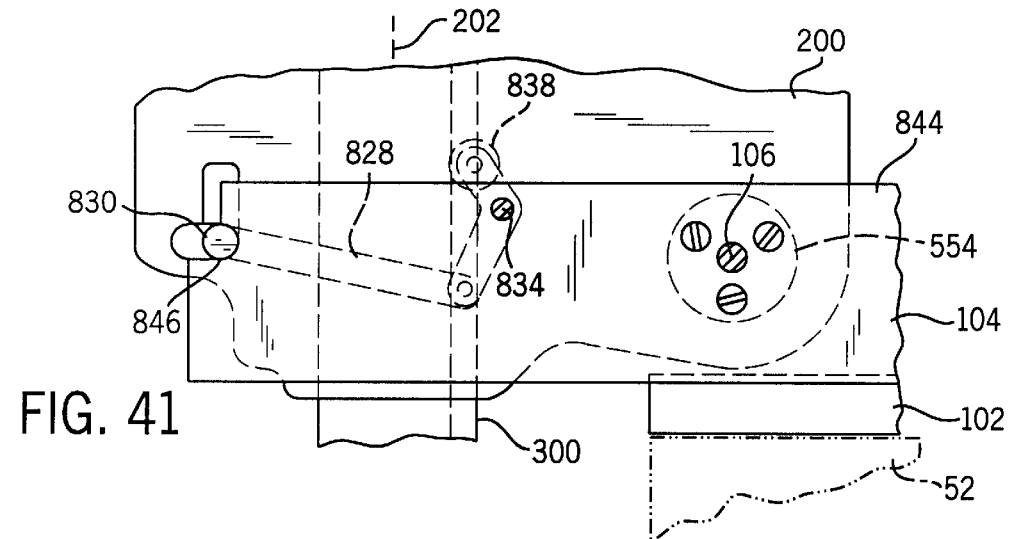
FIG. 41 is a side elevational view of the unit and adjacent chassis taken lines 41—41 of FIG. 25.

As shown by FIG. 41, walls 844 of chassis 104 each include a detent, notch or slot 846 sized and located to receive ends of crossbar 830 during deployment of shaft support 300 and propulsion unit 400 and to allow ejection of crossbar 830 from slot 846 during pivotal movement of shaft support 300 and propulsion unit 400 towards a stowed position. When crossbar 830 is positioned within slots 846, crossbar 830 stationarily couples engagement members 808 and their engagement surfaces 816 to chassis 104. As a result, shaft support 300 and housing 200 pivot in a rearward direction relative to chassis 104 when impacting upon an underwater obstruction to move engagement surfaces 234 towards engagement surfaces 816 to compress the resilient bias members 810 therebetween. At the same time, while positioned within slots 846, crossbar 830 butts against housing 200 along horizontal portion 242 of slot 238 to prevent shaft support 300 and housing 200 from pivoting in a forward direction as a result of the thrust generated by propulsion unit 400 when propulsion unit 400 is deployed.

Figure 39:
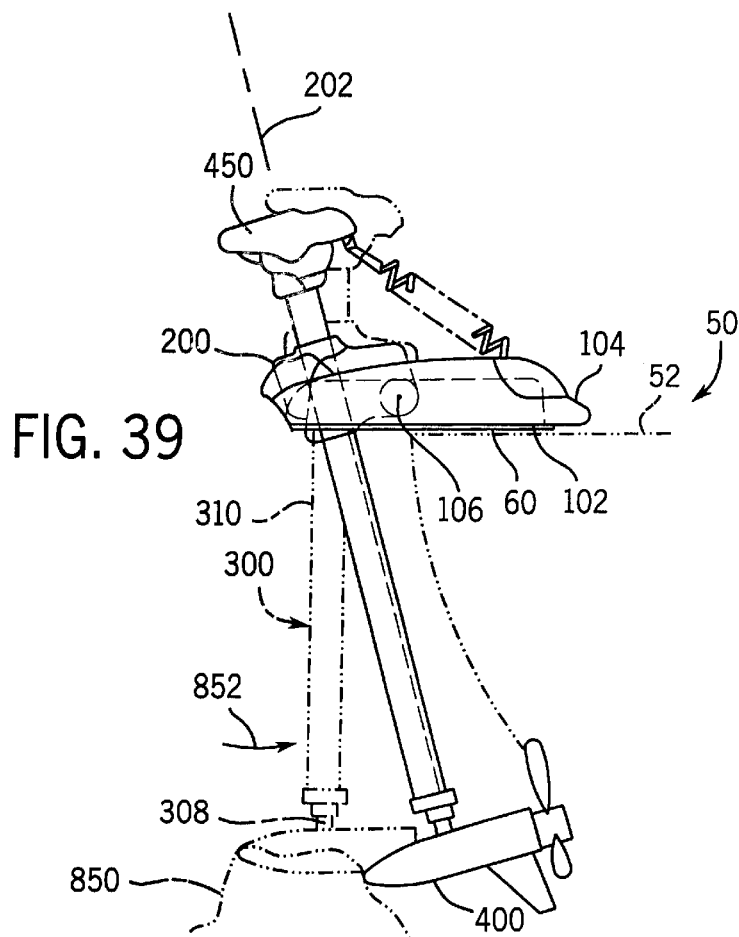
FIG. 39 is a side elevational view of the trolling motor system of FIG. 1 illustrating a propulsion unit encountering an underwater obstruction and pivoting rearweardly.
Figure 40:
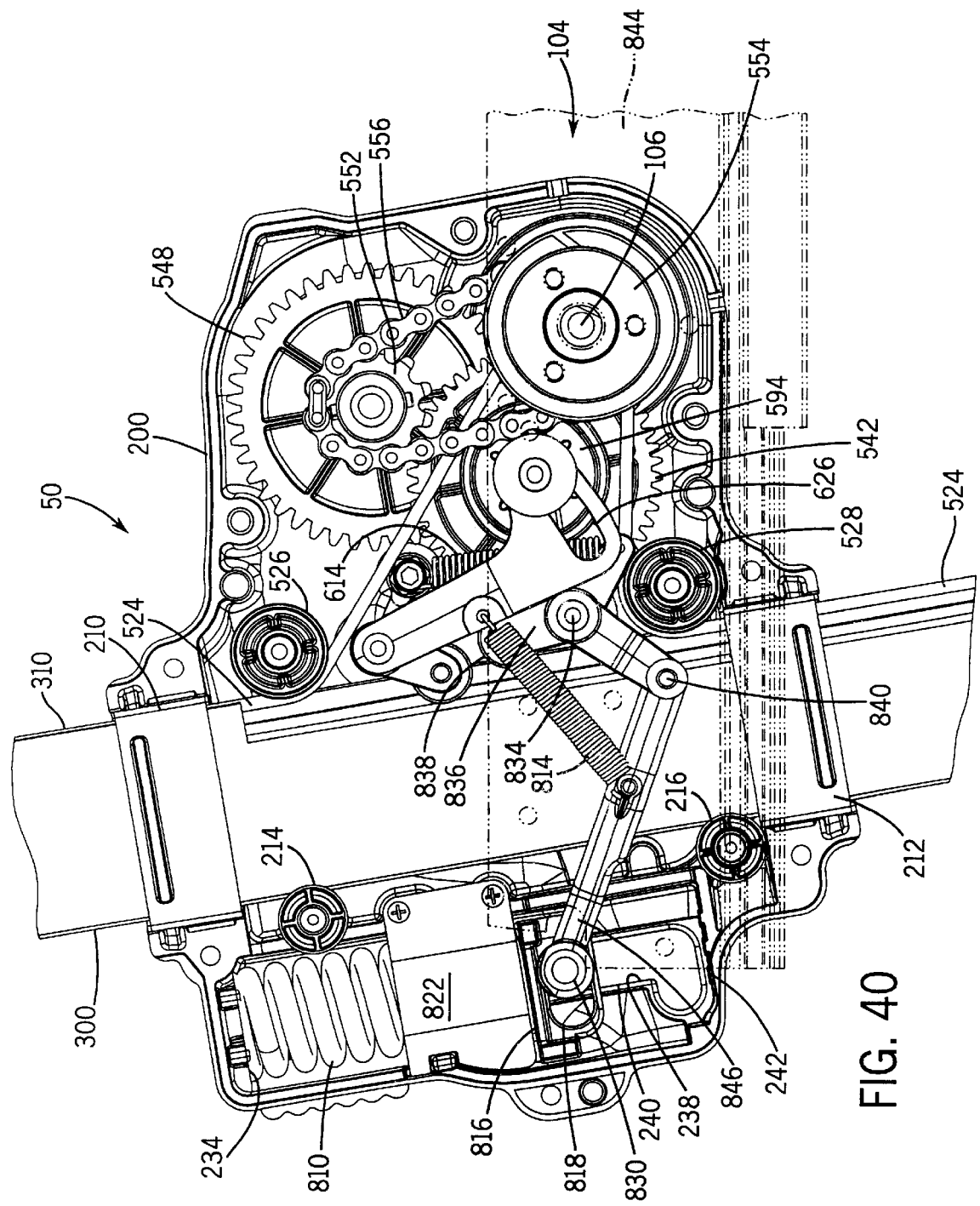
FIG. 40 is a side elevational view of the unit during the impact shown in FIG. 39 with portions removed for purposes of illustration.

FIG. 39 depicts propulsion unit 400 impacting upon and colliding with an underwater obstruction 850 which causes propulsion unit 400 and shaft support 300 to pivot in the direction indicated by arrow 852 to slow boat 52 and to minimize damage to trolling motor system 50. As shown by FIG. 40, during such collision, crossbar 830 remains within slot 846 of chassis 104. However, housing 200 pivots about axis 106. As housing 200 pivots about axis 106, vertical portion 240 of slot 238 accommodates the downward pivotal movement of housing 200 relative to the generally stationary crossbar 830. Pivotal movement of housing 200 about axis 106 further pivots engagement surface 234 towards engagement surface 816, compressing resilient bias members 810 therebetween to absorb energy from the collision. After the energy has been absorbed and the underwater obstruction 850 has been passed, resilient bias member 810 exerts a force against engagement surface 816 and against engagement surface 234 to return housing 200, shaft support 300 and propulsion unit 400 to the original generally vertical deployed orientation.

Figure 42:
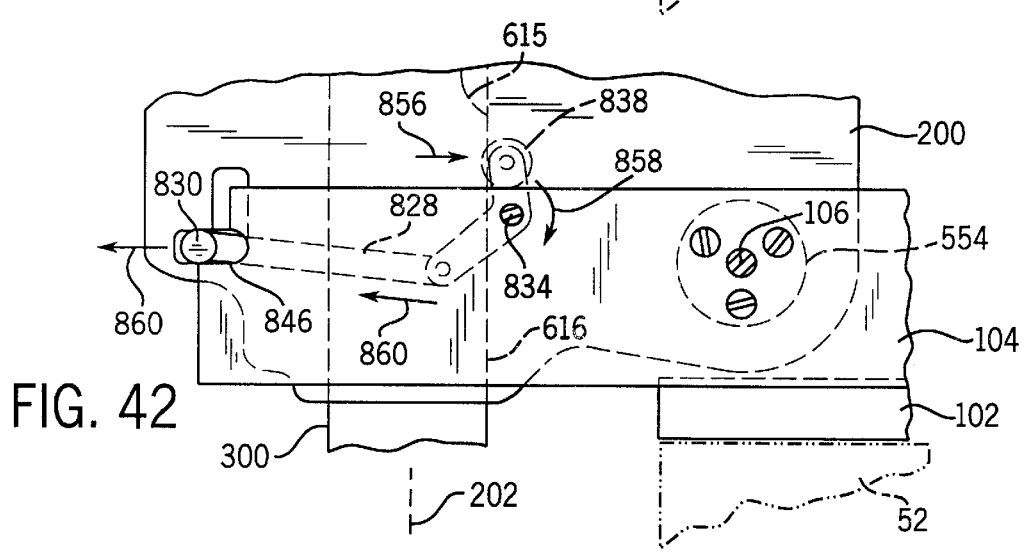
FIGS. 42 and 43 illustrate the unit and adjacent chassis of FIG. 41 as the trolling motor system is moved towards a stowed position.
Figure 43:
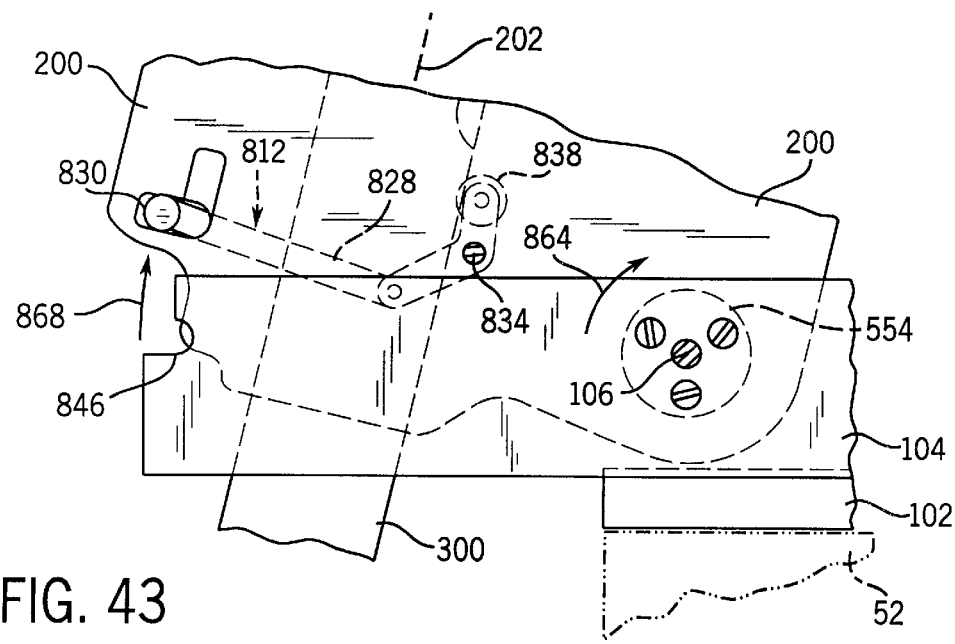

FIGS. 41–43 illustrate coupling member 812 actuating between a first deploying position (shown in FIG. 41) and a second stowing position. FIG. 42 illustrates shaft support 300 positioned along axis 202 by linear drive 504 such that roller 838 has ridden up upon upper ramp portion 615 onto plateau 616. As a result, cam 610 moves roller 838 in the direction indicated by arrow 856, causing actuation member 826 to pivot about axis 834 in the direction indicated by arrow 858. Thus, yoke 828 and crossbar 830 are moved in the directions indicated by arrows 860 so as to eject crossbar 830 from slots 846.

As shown by FIG. 43, continued upward movement of shaft support 300 brings upper ramp 615 and plateau 616 into engagement with roller 622 of cam follower 612 to actuate coupler 508 to the connected position. As a result, pivot drive 506 begins pivoting housing 200 about axis 106 in the direction indicated by arrow 864. Pivotal movement of housing 200 about axis 106 lifts crossbar 830 of coupling member 812 further out of slot 846 as indicated by arrow 868.

In short, this arrangement enables housing 200 and shaft support 300 to pivot in a first direction about axis 106 from a deployed position to a stowed position as shown in FIG. 43 and to also pivot in an opposite second direction about the same axis 106 when encountering an underwater obstruction such as shown in FIG. 39. Because impact protection system 800 allows such a pivoting about a single axis, impact protection system 800 requires fewer parts, is less complicated and requires less space. At the same time, impact protection system 800 prevents any pivotal movement of housing 200 or shaft support 300 under thrust generated by propulsion unit 400 in the forward direction. Thus, resilient bias members 810 having lower spring constants may be employed for greater sensitivity and responsiveness to impacts with underwater obstructions.

FOOT CONTROL

Figure 44:
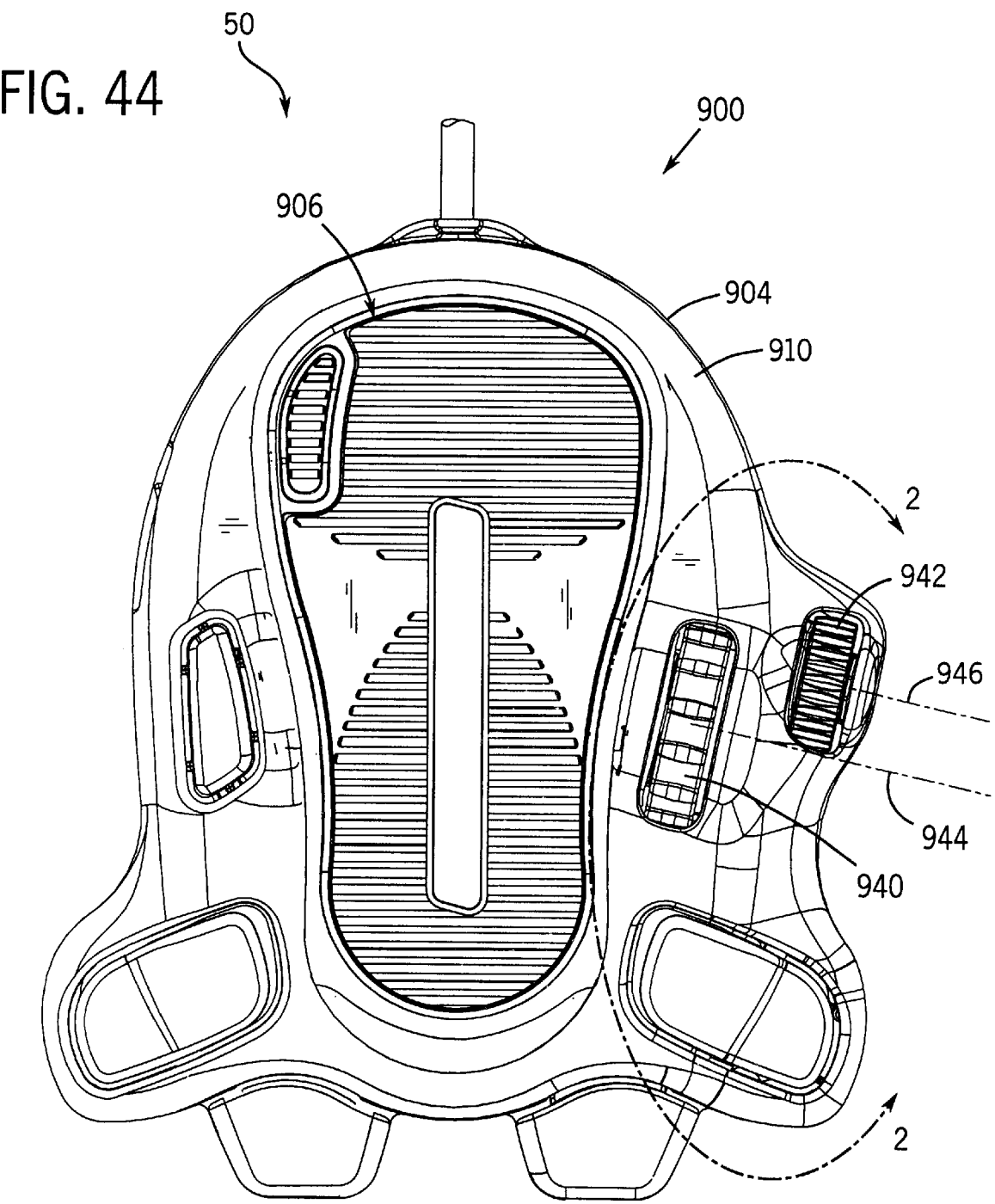
FIG. 44 is a top elevational view of a foot control of the trolling motor system of FIG. 1.
Figure 45:
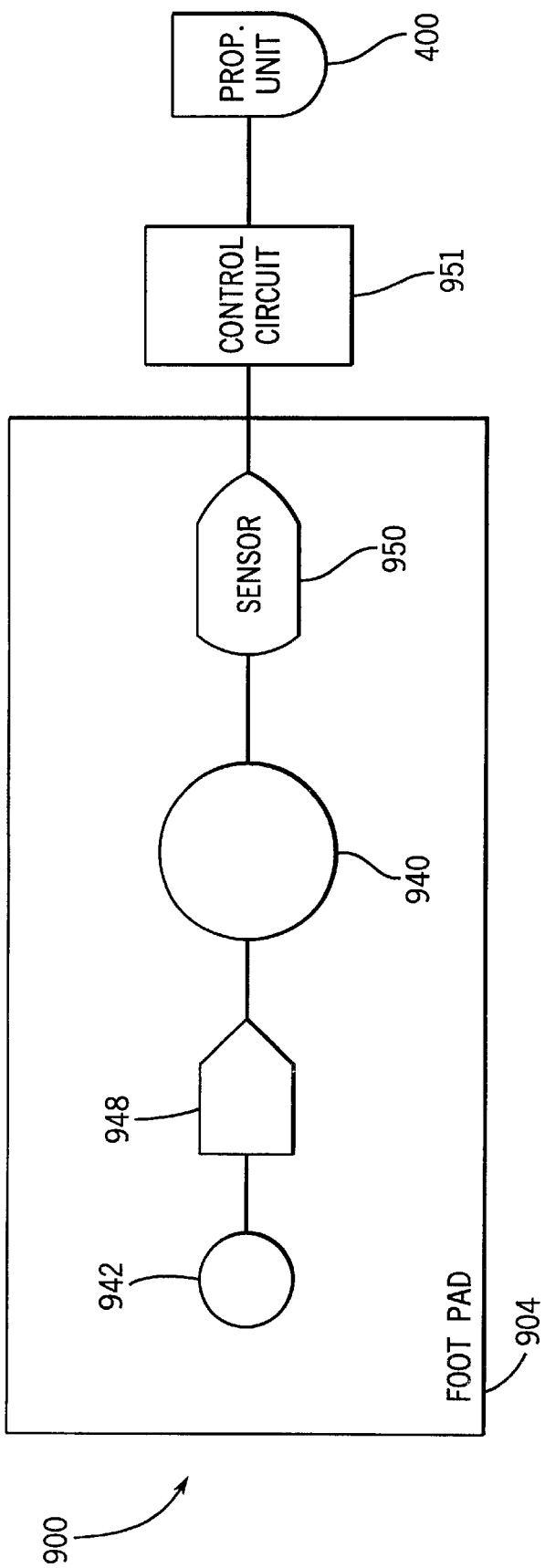
FIG. 45 is a schematic of the foot control of FIG. 44.

FIGS. 44–47 illustrate foot control 900 in greater detail. As best shown by FIG. 44, foot control 900 generally includes pad 904 and interfaces 906. Interfaces 906 are electronically coupled to control circuit 908, preferably housed within chassis 104. Interfaces 906 comprise depressment buttons, switches and other means by which input can be made by the operator's foot. Interfaces 906 include coarse adjustment knob 940 and fine adjustment knob 942. As shown by FIG. 1, pad 904 has generally an upper surface 910 above which knobs 940 and 942 extend. In the exemplary embodiment, knobs 940 and 942 comprise dials or disks having circumferential surfaces extending above upper surface 910. Rotation of knob 940 about axis 944 by the operator's foot adjusts the speed or amount of thrust generated by propulsion unit 400 at a first rate. Likewise, rotation of knob 942 about axis 946 by the operator's foot adjusts the speed or amount of thrust generated by propulsion unit 400 at a second smaller rate. In the exemplary embodiment, axes 944 and 946 about which knobs 940 and 942 rotate are non-coincident and extend generally parallel to one another. Alternatively, axes 944 and 946 may be coincident or may extend along non-coincident axes which are non-parallel to one another. FIG. 45 is a schematic illustrating the speed or thrust adjustment portion of foot control 900 in operable detail. As shown by FIG. 45, foot control 900 additionally includes rotational reduction unit 948 and sensor 950. Rotational reduction unit 948 couples fine adjustment knob 942 to coarse adjustment knob 940 such that rotation of knob 942 will cause the rotation of knob 940. Reduction unit 948 is configured such that rotation of knob 942 by a first angular extent causes knob 940 to rotate by a corresponding second lesser angular extent. Reduction unit 948 comprises any of a variety of such devices including gear reduction units having a plurality of intermeshed gears with different radii, chain and sprocket reduction systems having differently sized sprockets interconnected by chains, or belt and pulley reduction systems with different sized pulleys interconnected by belts. Rotational reduction unit 948 greatly simplifies control 900 by enabling both fine and coarse speed adjustment to be made using two separate interfaces, knobs 940 and 942, and only a single sensor 950. As a result, valuable space is conserved.

Sensor 950 is coupled to coarse adjustment knob 940 and is configured to sense or detect the rotational position of knob 940. Sensor 950 also inherently detects the rotational position of knob 942 which has a predetermined relationship with the rotational position of knob 940 due to reduction unit 948. Sensor 950 preferably comprises a conventionally known potentiometer. As further shown by FIG. 45, sensor 950 is in turn connected to control circuit 951 which is in turn connected to propulsion unit 400. Sensor 950 generates signals representing the rotational position of knobs 940 and 942 and transmits such signals to control circuit 951. Control circuit 951 generates control signals that are transmitted to propulsion unit 400 and that control the speed or thrust generated by propulsion unit 400.

Although foot control 900 is illustrated in FIG. 45 as having sensor 950 coupled to coarse control knob 940, sensor 950 may alternatively be coupled to fine adjustment knob 942. Although less desirable, each of knobs 940 and 942 may be provided with a dedicated sensor, eliminating the need for reduction unit 948.

Figure 46:
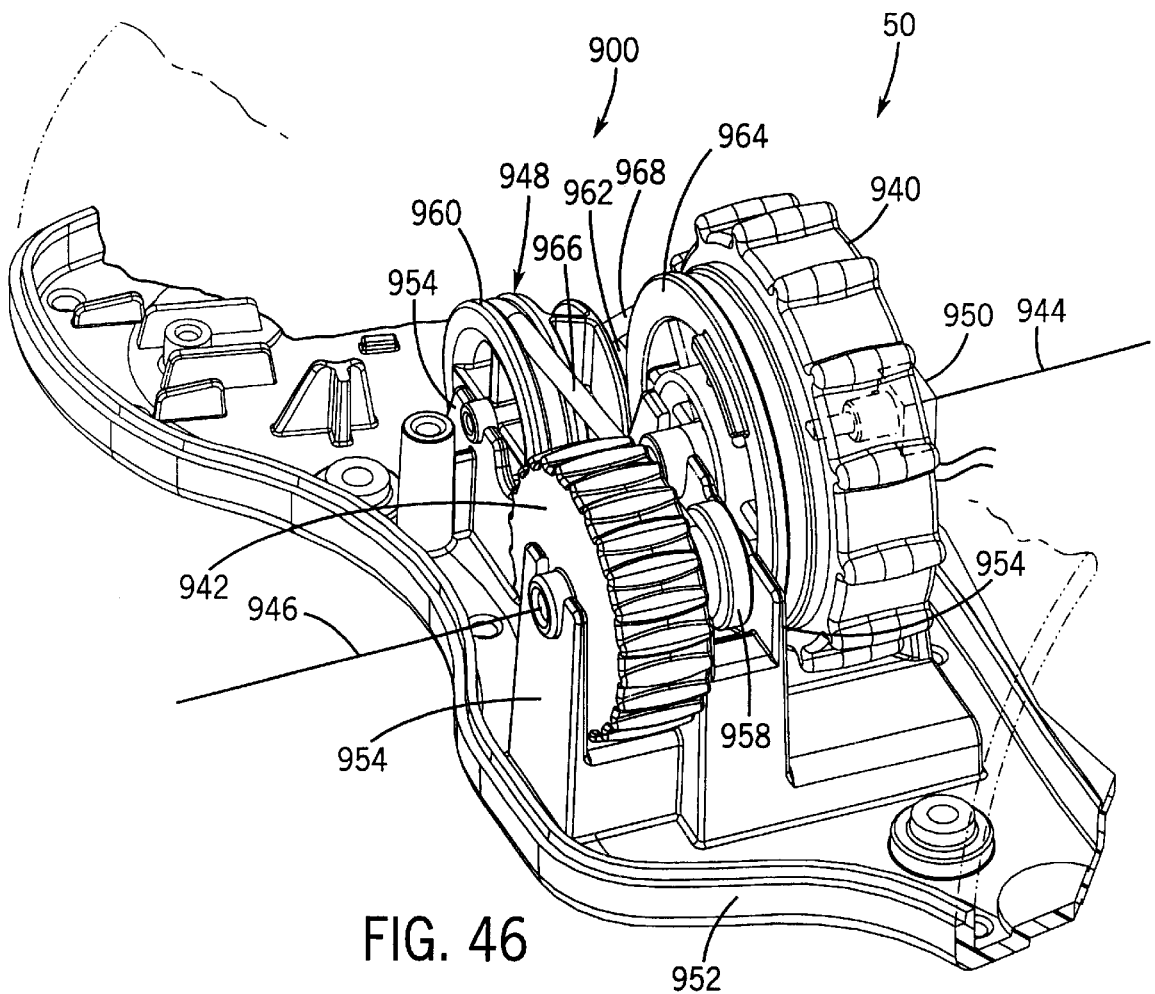
FIG. 46 is a fragmentary perspective view of the foot control of FIG. 44 with portions removed for purposes of illustration.
Figure 47:
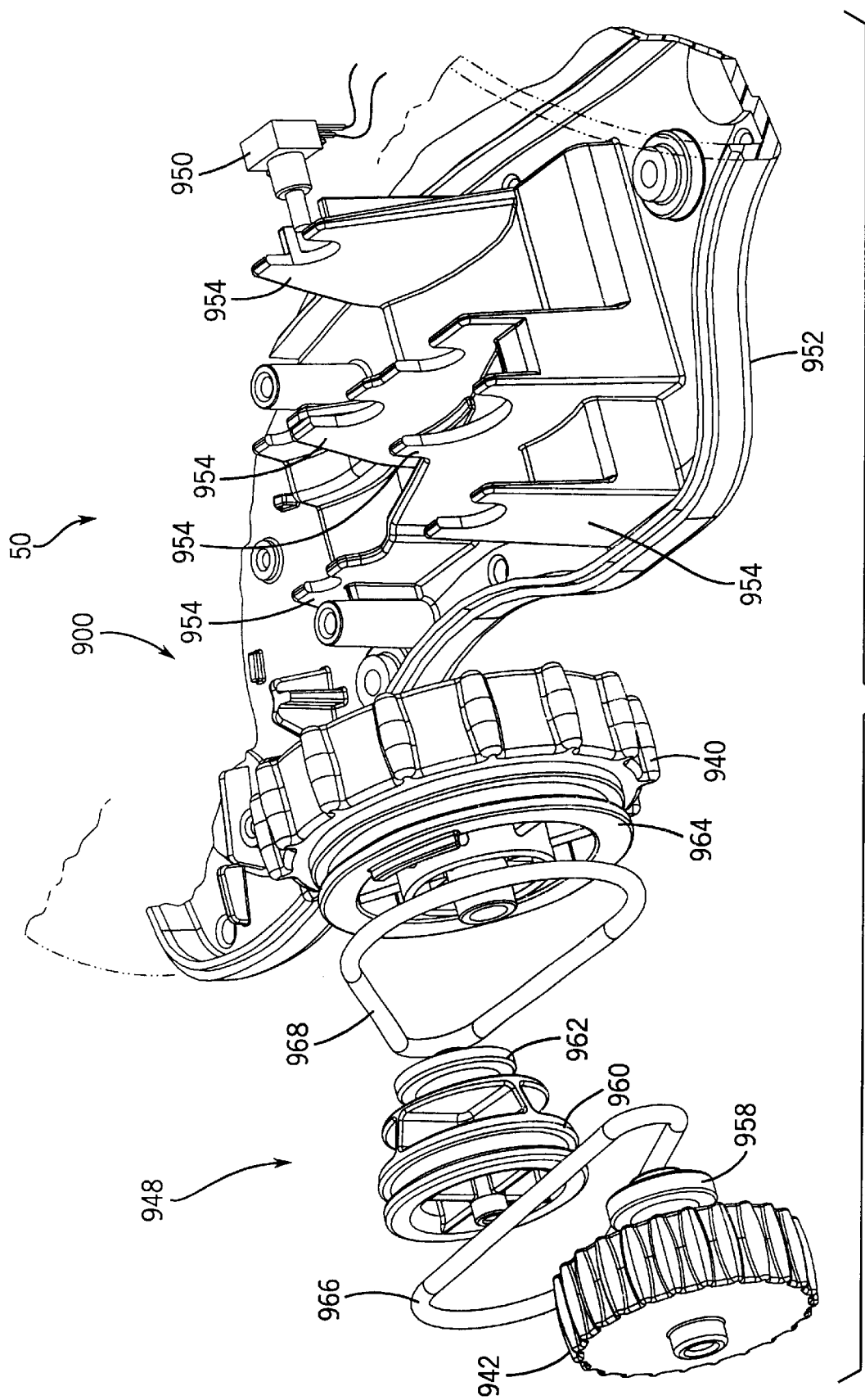
FIG. 47 is a fragmentary perspective exploded view of the foot control of FIG. 44 with portions removed for purposes of illustration.

FIG. 46 and FIG. 47 illustrate the preferred embodiment of the speed or thrust adjustment portion of foot control 900. FIGS. 46 and 47 also illustrate coarse adjustment knob 940 and fine adjustment knob 942 in greater detail. In particular, FIG. 46 is a fragmentary perspective view of foot control 900 with upper surface 910 removed for purposes of illustration. FIG. 47 is an exploded perspective view of the foot pad of FIG. 44. As best shown by FIG. 47, control 900 includes a base 952 from which a plurality of trunnion supports 954 extend and rotatably support knobs 940 and 942 for rotation about axes 944 and 946, respectively. As will be appreciated, knobs 940 and 942 may be rotatably supported about axes 944 and 946 by various other rotational support structures including bearings and the like.

As further shown by FIG. 46 and FIG. 47, the exemplary embodiment includes rotational reduction unit 948 including a series of pulleys 958, 960, 962 and 964 interconnected by belts 966 and 968. Pulleys 958, 960, 962 and 964 have appropriately sized radii to effect rotational reduction such that rotation of knob 942 by a first angular extent causes rotational reduction of knob 940 by a second lesser angular extent. In the exemplary embodiment, the ratio is preferably ten to one, such that ten rotations of knob 942 equal one rotation of knob 940. As shown by FIG. 47, pulley 958 and pulley 964 are preferably integrally formed with knobs 942 and 940, respectively. Pulleys 960 and 962 are preferably integrally formed together and rotatably supported by a trunnion support 954. Alternatively, pulleys 958, 960, 962 and 964 may be secured to knobs 940 and 942 using other fastening methods. Moreover, reduction unit 948 may alternatively include fewer or a greater number of such pulleys as desired, to effectuate the desired ratio between knobs 942 and 940. Moreover, reduction unit 948 may alternatively include fewer or a greater number of such pulleys as desired, to effectuate the desired ratio between knobs 942 and 940.

CONCLUSION

In conclusion, trolling motor support system 50 provides numerous advantages over prior trolling motor systems. In particular, bow mount system 100 enables a person fishing to quickly and easily mount and dismount trolling motor system 50 with respect to the bow of a boat by simply lowering chassis 104 onto base 102 with puck 130 positioned within window 148 and by rotating lever 144 to lock chassis 104 and trolling motor system 150 to base 102. Bow mount system 100 eliminates the need for aligning the chassis and the base end to end and axially sliding the chassis and the base relative to one another.

Shaft support 300 provides a robust arrangement for supporting propulsion unit 400. Because shaft support 300 provides a dual-walled structure of material that is somewhat flexible, shaft support 300 is resistant to impacts with underwater obstructions. Because outer shaft 310 has a greater longitudinal length and a smaller transverse width, outer shaft 310 is stronger and more durable during collisions when boat 52 is moving in the forward direction. At the same time, the non-circular cross-sectional shape of outer shaft 310 accommodates passage 312 which guides and protects transducer wire 72. Because passage 312 is formed along outer shaft 310, shaft support 300 facilitates the use of trolling motor system 50 with after market underwater sonar systems.

Drive system 500 moves shaft support 300 and propulsion unit 400 from a generally vertically extending position all the way to a generally horizontally extending position and vice versa. Drive system 500 also enables a depth or trim of the propulsion unit to be remotely adjusted. Drive system 500 provides such functions while remaining relatively simple and compact in nature. In addition, drive system 500 automatically begins pivotal movement of shaft support 300 and propulsion unit 400 based upon the detected position of shaft support 300 along its own axis.

Impact protection system 800 protects trolling motor system 50 from collisions with underwater objects, while remaining lightweight, simple and compact. Impact protection system 800 provides uni-directional obstruction-responsive pivotal movement of trolling motor system 50 and propulsion unit 400 while permitting propulsion unit 400 to be withdrawn from the water when not in use. Impact protection system 800 automatically actuates between a first position in which trolling motor system 50 may be pivoted only in the first direction when deployed and a second position in which trolling motor system 50 may be pivoted in a second opposite direction when being stowed based upon a detected position of shaft support 300 and propulsion unit 400.

Foot control 900 enables a trim or height of propulsion unit 400 to be remotely adjusted and provides for precise control of the speed of propulsion unit 400 without the use of one's hands and from remote locations within boat 52. Because foot control 900 preferably includes a pair of knobs interconnected by a rotational reduction unit, foot control 900 has fewer parts, is simpler to manufacture and is more compact.

FIGS. 1–47 illustrate but a few exemplary embodiments of trolling motor system 50. Although bow mount system 100, shaft support 300, drive system 500, impact protection system 800 and foot control 900 are preferably used in conjunction with one another to form trolling motor system 50, each may alternatively be used, with or without slight modifications, separately in other trolling motor systems. For example, bow mount system 100 may be used with any of a variety of well-known trolling motor systems designed to be secured to a bow of a boat. With appropriate modifications, bow mount system 100 may be adapted for use along a transom or stern of a boat as well. Although shaft support 300 is illustrated with a bow mounted trolling motor system 50, shaft support 300 may alternatively be used on transom mount trolling motors. Although shaft support 300 is illustrated as being raised and lowered by drive system 500, shaft support 300 may alternatively be utilized on trolling motor systems in which the propulsion unit is not raised or lowered along its own axis, in trolling motor systems where the shaft and propulsion unit are merely pivoted or in trolling motor systems in which the shaft and propulsion unit are generally stationarily held in the water. In addition, outer shaft 310 may be utilized independently without inner shaft 308 in some trolling motor system applications, wherein the propulsion unit is directly attached to the lower end of outer shaft 310 and wherein control wires for the propulsion unit are routed through the interior of outer shaft 310. Drive system 500 may alternatively be utilized separately from bow mount system 100, shaft support 300, impact protection system 800 or foot control 900. In applications where pivotal movement of propulsion unit 400 is not desired, pivot drive 506 may be eliminated. Conversely, in applications where linear movement of the shaft and propulsion unit is not desired, linear drive 504 may be eliminated. Moreover, linear drive 504 may alternatively be configured to drivenly engage and lift shaft support 300 along its own axis wherein an upper end of shaft support 300 is completely housed within the housing such as described and illustrated in U.S. Pat. No. 6,213,821, entitled TROLLING MOTOR ASSEMBLY, issued on Apr. 10, 2001, the full disclosure of which, in its entirety, is hereby incorporated by reference. In such an alternative configuration, pivot drive 506 can be configured to pivot the housing containing shaft support 300 about a horizontal axis relative to a supporting chassis. Impact protection system 800 may be used on any of a variety of other well-known bow mount trolling motor systems substantially independent of the other aforementioned features of trolling motor system 50. Foot control 900 may alternatively be used with other foot-controlled outboard trolling motor systems including transom mount trolling motor systems.

Although the present invention has been described with reference to preferred embodiments, workers skilled in the art will recognize that changes may be made in form and detail without departing from the spirit and scope of the invention. Because the technology of the present invention is relatively complex, not all changes in the technology are foreseeable. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A bow mount for a trolling motor, the mount comprising:
   a base adapted to be mounted to a bow of a boat, the base including a pair of longitudinally extending spaced side channels;
   a chassis adapted to be coupled to the trolling motor, the chassis including a pair of spaced longitudinally extending side projections;
   an actuation mechanism between the chassis and the base, the actuation mechanism configured to move at least one of the side projections and the side channels in a transverse direction relative to one another such that the projections extend into the channels; and
   a retaining mechanism configured to removably retain the projections in the channels.

2. The mount of claim 1, wherein the pair of spaced side channels face in a first direction and wherein the pair of spaced side projections extend in a second opposite direction.

3. The mount of claim 1, wherein the pair of spaced side channels and the pair of spaced side projections continuously extend along substantially an entire longitudinal length of the base and the chassis, respectively.

4. The mount of claim 1, wherein the actuator includes:
   a first actuation surface coupled to one of the base and the chassis; and
   a second actuation surface movably coupled to the other of the base and the chassis, the second actuation surface being movable between a locking position in which the second actuation surface engages the first actuation surface to move the base and the chassis relative to one another such that the spaced side channels receive the spaced side projections and a releasing position in which the second actuation surface is disengaged from the first actuation surface to permit the side projections to be removed from the side channels such that the chassis is released from the base in at least one direction.

5. The mount of claim 4, wherein the second actuation surface is resiliently biased towards the releasing position.

6. The mount of claim 5, including a lever coupled to the second actuation surface and configured to move the second actuation surface between the locking position and the releasing position.

7. The mount of claim 6, wherein the lever pivots between a first position in which the second actuation surface is in the locking position and a second position in which the second actuation surface is in a releasing position.

8. The mount of claim 7, including means for retaining the lever in the first position.

9. The mount of claim 4, wherein said one of the base and the chassis includes a puck providing the first actuation surface and wherein the other of the base and the chassis includes a draw bar including a window sized to receive the puck and providing the second actuation surface.

10. The mount of claim 9, wherein said one of the base and the chassis includes a pair of opposing tracks slidably receiving the drawbar therebetween.

11. The mount of claim 1, wherein the second actuation surface linearly moves between the locking position and the releasing position.

12. The mount of claim 1, wherein the chassis includes the first actuation surface and wherein the base assembly includes the second actuation surface.

13. A mount for a trolling motor, the mount comprising:
   a base assembly adapted to be mounted to a boat, the base assembly including a first one of a male member and a female member;
   a chassis adapted to be coupled to the trolling motor, the chassis including a second one of the male member and the female member, wherein at least one of the male member and the female member is movably coupled to at least one of the base and the chassis for sideways movement between an engaged position in which the female member receives the male member and a disengaged position while the chassis overlies the base; and
   a locking assembly including:
      a first actuation surface coupled to one of the base assembly and the chassis; and
      a second actuation surface movably coupled to the other of the base assembly and the chassis, wherein the second actuation surface is moveable between a locking position in which the second actuation surface engages the first actuation surface to retain the male member and the female member in the engaged position to lock the chassis to the base assembly in at least one direction, and a releasing position in which the second actuation surface is disengaged from the first actuation surface to permit the male member to be removed from the female member such that the chassis may be released from the base assembly in at least one direction.

14. The mount of claim 13, wherein the male member comprises a projection of a first dovetail and wherein the female member comprises a groove of a second dovetail.

15. The mount of claim 1, wherein one of the pair of spaced side channels and the pair of spaced side projections face one another and wherein the other of the pair of spaced side channels and the pair of spaced side projections face away from one another.

16. The mount of claim 1, wherein at least one of the pair of side projections and the pair of side channels are movably coupled to the chassis and the base, respectively.

17. A trolling motor adapted to be mounted to a base having a pair of spaced side channels in a bow of a boat, the trolling motor comprising:
   a lower propulsion unit;
   a shaft supporting the lower propulsion unit;
   a chassis supporting the shaft, the chassis including a pair of spaced side projections;
   an actuator adapted to move the side projections in at least one sideways direction into the side channels; and
   a retainer adapted to releasably retain the projections in the channels.

18. A method for releasably mounting a trolling motor to a bow of a boat, the method comprising:
   providing a base on the bow of the boat, the base having a pair of spaced side channels;
   providing a trolling motor assembly having a pair of spaced projections;
   lowering the trolling motor assembly onto the base such that at least one of the side projections extends between the pair of spaced side channels;
   moving at least one of the side projections and the side channels in a sideways direction relative to one another such that the projections extend into the channels; and releasably retaining the projections in the channels to releasably mount the trolling motor to the bow of the boat.

19. The method of claim 18, wherein the step of moving at least one of the side projections and side channels in a sideways direction comprises moving the side projections in a sideways direction into the side channels.

20. The mount of claim 1, wherein moving the side projections includes moving the pair of side projections in a common direction into the side channels.

21. A mount for an underwater propulsion unit, the mount comprising:
- a base adapted to be mounted to a boat, the base including a first one of a male member and a female member;
- a chassis adapted to be coupled to the propulsion unit, the chassis further including a second one of a male member and a female member, wherein at least one of the male member and the female member is movable between an engaged position in which the female member receives the male member to retain the chassis upon the base and a disengaged position in which the male member is removed from the female member while the second one of the male member and the female member of the chassis at least partially directly overlies the base just prior to engagement of the male member and the female member.

22. The mount of claim 21 including an actuation mechanism configured to move at least one of the male member and the female member between the engaged position and the disengaged position.

23. The mount of claim 21 including a retaining mechanism configured to removably retain the male member and female member in the engaged position.

24. The mount of claim 21, wherein the male member includes a projection and wherein the female member comprises a channel configured to receive the projection.

* * * * *